(12) United States Patent
Ganick et al.

(10) Patent No.: US 9,055,200 B1
(45) Date of Patent: *Jun. 9, 2015

(54) CONTENT DELIVERY BASED ON A LIGHT POSITIONING SYSTEM

(71) Applicants: Aaron Ganick, North Reading, MA (US); Daniel Ryan, North Andover, MA (US)

(72) Inventors: Aaron Ganick, North Reading, MA (US); Daniel Ryan, North Andover, MA (US)

(73) Assignee: BYTELIGHT, INC., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/464,328

(22) Filed: Aug. 20, 2014

Related U.S. Application Data

(63) Continuation of application No. 13/369,147, filed on Feb. 8, 2012.

(60) Provisional application No. 61/567,484, filed on Dec. 6, 2011.

(51) Int. Cl.
*H04N 7/18* (2006.01)
*G01S 1/70* (2006.01)
*G01S 5/16* (2006.01)

(52) U.S. Cl.
CPC ....... *H04N 7/183* (2013.01); *G01S 1/70* (2013.01); *G01S 5/16* (2013.01)

(58) Field of Classification Search
CPC ..... H04W 4/023; H04B 10/60; H04B 10/116; H04L 25/4902; H04N 7/183; G01S 1/70; G01S 5/16
USPC .......................................................... 348/61
See application file for complete search history.

(56) References Cited

U.S. PATENT DOCUMENTS

| 4,275,385 A | 6/1981 | White |
| 5,148,159 A | 9/1992 | Clark et al. |

(Continued)

FOREIGN PATENT DOCUMENTS

| EP | 2737779 A1 | 6/2014 |
| JP | 2008-224536 A | 9/2008 |

(Continued)

OTHER PUBLICATIONS

"Visible Light Communication (VLC) Systems", available online at <http://bemri.org/visible-lightcommunication.html> retrived on Mar. 10, 2012, 5 pages.

(Continued)

*Primary Examiner* — Allen Wong
(74) *Attorney, Agent, or Firm* — Morgan, Lewis & Bockius LLP

(57) ABSTRACT

Systems an methods are provided that disclose providing a positioning service for devices based on light received from one or more light sources. This light based positioning service uses light information transmitted by each light source to determine the position of the device. The positioning information can include three dimension position information in a building that can then be used to deliver services and information to a mobile device. The content delivered to a mobile device can include multimedia, text, audio, and/or pictorial information. The positioning information along with other location or positioning information can be used in providing augmented reality or location aware services. The light sources can be independent beacons that broadcast information in visible light at a rate that is undetectable by the human eye. Content can be retrieved from a server over a communications connection.

29 Claims, 17 Drawing Sheets

(56) References Cited

U.S. PATENT DOCUMENTS

| | | | |
|---|---|---|---|
| 5,521,345 A | 5/1996 | Wulc | |
| 6,198,230 B1 | 3/2001 | Leeb et al. | |
| 6,400,482 B1 | 6/2002 | Lupton et al. | |
| 6,426,599 B1 | 7/2002 | Leeb | |
| 6,450,816 B1 | 9/2002 | Gerber | |
| 6,495,783 B2 | 12/2002 | Rochon et al. | |
| 6,504,633 B1 | 1/2003 | Hovorka et al. | |
| 6,548,967 B1 | 4/2003 | Dowling et al. | |
| 6,590,687 B1 | 7/2003 | Olsen | |
| 6,608,453 B2 | 8/2003 | Morgan et al. | |
| 6,614,126 B1 | 9/2003 | Mitchell | |
| 6,701,092 B2 | 3/2004 | Doucet et al. | |
| 6,794,831 B2 | 9/2004 | Leeb et al. | |
| 6,807,478 B2 | 10/2004 | Giannopoulos et al. | |
| 6,865,347 B2 | 3/2005 | Perkins et al. | |
| 6,954,591 B2 | 10/2005 | Lupton et al. | |
| 6,985,744 B2 | 1/2006 | Katagishi et al. | |
| 7,016,115 B1 | 3/2006 | Leeb et al. | |
| 7,022,928 B2 | 4/2006 | Watanabe et al. | |
| 7,123,159 B2 | 10/2006 | Giannopoulos et al. | |
| 7,230,196 B2 | 6/2007 | Toyama | |
| 7,265,307 B2 | 9/2007 | Miyasaka et al. | |
| 7,309,965 B2 | 12/2007 | Dowling et al. | |
| 7,352,972 B2 | 4/2008 | Franklin | |
| 7,415,212 B2 | 8/2008 | Matsushita et al. | |
| 7,446,276 B2 | 11/2008 | Plesko et al. | |
| 7,446,671 B2 | 11/2008 | Giannopoulos et al. | |
| 7,449,654 B2 | 11/2008 | Tsuduki | |
| 7,525,059 B2 | 4/2009 | Masuda et al. | |
| 7,547,858 B2 | 6/2009 | Nagata | |
| 7,583,901 B2 | 9/2009 | Nakagawa et al. | |
| 7,683,954 B2 | 3/2010 | Ichikawa et al. | |
| 7,724,301 B2 | 5/2010 | Alakarhu | |
| 7,738,884 B2 | 6/2010 | Cheung et al. | |
| 7,741,573 B2 | 6/2010 | Masuda et al. | |
| 7,796,780 B2 | 9/2010 | Lipton et al. | |
| 7,969,297 B2 | 6/2011 | Haartsen et al. | |
| 7,970,537 B2 | 6/2011 | Ann et al. | |
| 7,973,819 B2 | 7/2011 | Shimada | |
| 8,107,825 B2 | 1/2012 | Rajagopal et al. | |
| 8,195,054 B2 | 6/2012 | Son et al. | |
| 8,213,801 B2 | 7/2012 | Nien et al. | |
| 8,248,467 B1 | 8/2012 | Ganick et al. | |
| 8,334,898 B1 | 12/2012 | Ryan et al. | |
| 8,334,901 B1 | 12/2012 | Ganick et al. | |
| 8,379,107 B2 | 2/2013 | Chen | |
| 8,416,290 B2 | 4/2013 | Ryan et al. | |
| 8,432,438 B2 | 4/2013 | Ryan et al. | |
| 8,436,896 B2 | 5/2013 | Staats et al. | |
| 8,457,502 B2 | 6/2013 | Ryan et al. | |
| 8,494,218 B2 | 7/2013 | Chen et al. | |
| 8,520,065 B2 | 8/2013 | Staats et al. | |
| 8,866,391 B2 | 10/2014 | Ganick et al. | |
| 2004/0204848 A1 | 10/2004 | Matsuo et al. | |
| 2004/0256211 A1 | 12/2004 | Chen | |
| 2005/0177423 A1 | 8/2005 | Swanson | |
| 2005/0232642 A1 | 10/2005 | Egner et al. | |
| 2006/0045311 A1 | 3/2006 | Shibuya | |
| 2006/0056855 A1 | 3/2006 | Nakagawa et al. | |
| 2006/0119287 A1 | 6/2006 | Campbell et al. | |
| 2006/0157760 A1 | 7/2006 | Hayashi et al. | |
| 2006/0287113 A1 | 12/2006 | Small et al. | |
| 2007/0139405 A1 | 6/2007 | Marcinkiewicz | |
| 2007/0254694 A1 | 11/2007 | Nakagwa et al. | |
| 2007/0275750 A1 | 11/2007 | Nakagawa | |
| 2008/0028013 A1 | 1/2008 | Kamegawa et al. | |
| 2008/0077326 A1 | 3/2008 | Funk et al. | |
| 2008/0205477 A1 | 8/2008 | Hama et al. | |
| 2009/0026978 A1 | 1/2009 | Robinson | |
| 2009/0040367 A1 | 2/2009 | Zakrzewski et al. | |
| 2009/0045955 A1 | 2/2009 | Ulrich | |
| 2009/0085500 A1 | 4/2009 | Zampini et al. | |
| 2009/0157309 A1 | 6/2009 | Won et al. | |
| 2009/0171571 A1 | 7/2009 | Son et al. | |
| 2009/0245788 A1 | 10/2009 | Varshneya et al. | |
| 2009/0269073 A1 | 10/2009 | Kitaji | |
| 2009/0284366 A1 | 11/2009 | Haartsen et al. | |
| 2009/0310971 A1 | 12/2009 | Kim et al. | |
| 2010/0014136 A1 | 1/2010 | Haussler et al. | |
| 2010/0151903 A1 | 6/2010 | Yamamoto | |
| 2010/0159943 A1 | 6/2010 | Salmon | |
| 2010/0176732 A1 | 7/2010 | Schenk et al. | |
| 2010/0208236 A1 | 8/2010 | Damink et al. | |
| 2010/0208986 A1 | 8/2010 | Cobb et al. | |
| 2010/0219774 A1 | 9/2010 | Bianco et al. | |
| 2010/0244746 A1 | 9/2010 | Van De Sluis et al. | |
| 2011/0026918 A1 | 2/2011 | Kim et al. | |
| 2011/0032230 A1 | 2/2011 | Sun et al. | |
| 2011/0069951 A1 | 3/2011 | Son et al. | |
| 2011/0105134 A1 | 5/2011 | Kim et al. | |
| 2011/0135317 A1 | 6/2011 | Chaplin | |
| 2011/0136536 A1 | 6/2011 | Garudadri et al. | |
| 2011/0153201 A1 | 6/2011 | Park et al. | |
| 2011/0176803 A1 | 7/2011 | Song et al. | |
| 2011/0266959 A1 | 11/2011 | Taipale et al. | |
| 2011/0298886 A1 | 12/2011 | Price et al. | |
| 2012/0080944 A1 | 4/2012 | Recker et al. | |
| 2012/0126909 A1 | 5/2012 | McCune, Jr. | |
| 2012/0155889 A1 | 6/2012 | Kim et al. | |
| 2012/0328302 A1 | 12/2012 | Iizuka et al. | |
| 2013/0026224 A1 | 1/2013 | Ganick et al. | |
| 2013/0026940 A1 | 1/2013 | Ganick et al. | |
| 2013/0026941 A1 | 1/2013 | Ganick et al. | |
| 2013/0026945 A1 | 1/2013 | Ganick et al. | |
| 2013/0027528 A1 | 1/2013 | Staats et al. | |
| 2013/0028475 A1 | 1/2013 | Ganick et al. | |
| 2013/0028609 A1 | 1/2013 | Staats et al. | |
| 2013/0029682 A1 | 1/2013 | Ganick et al. | |
| 2013/0030747 A1 | 1/2013 | Ganick et al. | |
| 2013/0040380 A1 | 2/2013 | Hunt et al. | |
| 2013/0126713 A1 | 5/2013 | Haas et al. | |
| 2013/0141554 A1 | 6/2013 | Ganick et al. | |
| 2013/0141555 A1 | 6/2013 | Ganick et al. | |
| 2013/0208132 A1 | 8/2013 | Ryan et al. | |
| 2014/0045549 A1 | 2/2014 | Ryan et al. | |
| 2014/0086590 A1 | 3/2014 | Ganick et al. | |
| 2014/0139744 A1 | 5/2014 | Ryan et al. | |
| 2014/0280316 A1 | 9/2014 | Ganick et al. | |

FOREIGN PATENT DOCUMENTS

| | | |
|---|---|---|
| KR | 1020080022298 A | 3/2008 |
| WO | 2011/064332 A1 | 6/2011 |
| WO | 2012/127439 A1 | 9/2012 |
| WO | 2014/063150 A2 | 4/2014 |
| WO | 2014/063150 A3 | 4/2014 |

OTHER PUBLICATIONS

Davies, Chris, "VLC D-Light LED Networking Takes on WiFi and GPS", available online at <http://www.slashgear.com/vlc-d-light-led-networking-takes-on-wifi-and-gps-video-08170160/>, Aug. 8, 2011, 3 pages.

Gursoy et al.,"On-Off Frequency-Shift Keying for Wideband Fading Channels", EURASIP Journal on Wireless Communications and Networking, vol. 2006, 2006, pp. 1-15.

Haruyama, Shinichiro, "Visible Light Communications: Recent Activities in Japan", Smart Spaces: A Smart Lighting ERC Industry—Academia Day at BU Photonics Center, Boston University, Feb. 8, 2011, pp. 1-49.

Khan, T. A., "Visible Light Communications Using Wavelength Division Multiplexing", Thesis for, Department of Electrical Engineering, University of Engineering and Technology, Lahore, 2006, 82 pages.

Liu et al., "Positioning Beacon System Using Digital Camera and LEDs", IEEE Transactions on Vehicular Technology, vol. 52, No. 2, Mar. 2003, pp. 406-419.

Osborne, Doug, "New LED Ceiling Lights Transmit Data Using Visible Light", available online at <http://www.geek.com/chips/new-led-ceiling-lights-transmit-data-using-visible-light-1306065/>, Jan. 17, 2011, 2 pages.

(56) References Cited

OTHER PUBLICATIONS

Pohlmann, Christian, "Visible Light Communication", Seminar Kommunikationsstandards in der Medizintechnik, Jun. 29, 2010, pp. 1-14.

Tanaka et al., "New Position Detection Method Using Image Sensor and Visible Light LEDs", Second International Conference on Machine Vision, 2009, pp. 150-153.

Tjan et al.,"Digital Sign System for Indoor Wayfinding for the Visually Impaired", IEEE Computer Society Conference on Computer Vision and Pattern Recognition—Workshops, Jun. 25, 2005, 8 pages.

International Preliminary Report on Patentability received for PCT Patent Application No. PCT/US2012/048164, issued on Jan. 28, 2014, 8 pages.

International Search Report and Written Opinion received for PCT Patent Application No. PCT/US2012/048164, mailed on Nov. 29, 2012, 13 pages.

International Search Report received for PCT Patent Application No. PCT/US2013/065923, mailed on May 7, 2014, 4 pages.

CONTENT DELIVERY BASED ON A LIGHT POSITIONING SYSTEM

CROSS-REFERENCE TO RELATED APPLICATIONS

This application is a continuation of U.S. patent application Ser. No. 13/369,147, filed Feb. 8, 2012, which claims the benefit of and priority to U.S. Provisional Patent Application No. 61/567,484, filed Dec. 6, 2011, the entire disclosure of each of which is hereby incorporated herein by reference.

FIELD OF THE DISCLOSURE

This disclosure relates generally to a system and method for providing content to a mobile device based on light positioning information determined from light received from one or more light sources.

BACKGROUND

Indoor positioning services refers to methods where networks of devices and algorithms are used to locate mobile devices within buildings. Indoor positioning is regarded as a key component of location-aware mobile computing and is a critical element in providing augmented reality (AR) services. Location aware computing refers to applications that utilize a user's location to provide content relevant to that location. Additionally, AR is a technology that overlays a virtual space onto a real (physical) space. To successfully enable AR and location aware computing, accurate indoor positioning is a key requirement.

Global Positioning Systems (GPS) loses significant power when passing through construction materials, and suffers from multi-path propagation effects that make it unsuitable for indoor environments. Techniques based on received signal strength indication (RSSI) from WiFi and Bluetooth wireless access points have also been explored. However, complex indoor environments cause radio waves propagate in dynamic and unpredictable ways, limiting the accuracy of positioning systems based on RSSI. Ultrasonic techniques (US), which transmit acoustic waves to microphones, are another method which can be used to approximate indoor position. They operate at lower frequencies than systems based on WiFi and attenuate significantly when passing through walls. This potentially makes US techniques more accurate than WiFi or Bluetooth techniques.

Optical indoor positioning techniques use optical signals, either visible or infrared, and can be used to accurately locate mobile devices indoors. These are more accurate than the approaches mentioned previously, since optical signals are highly directional and cannot penetrate solid objects. However this directionality limits the potential reliability of optical signals, since difficulty in aligning the receiver and transmitter can occur.

SUMMARY

Some embodiments disclose a method of determining a position of a camera enabled mobile device when it is indoors at a server, the server using at least one identification code broadcast from light sources in modulated light, the method including receiving at the server the at least one identification code from the camera enabled mobile device, determining based on the at least one identification code and geo-location information received from the mobile device a map that identifies positions of light sources in a building, wherein the geo-location information includes a geographical location of the camera enabled mobile device, calculating, based on the at least one identification code and the map that identifies locations of the light sources, indoor position information that identifies the location of the camera enabled mobile device within the building, and sending the indoor position information to the camera enabled mobile device to enable the camera enabled mobile device to locate itself within the building.

Certain embodiments disclose a method of providing indoor position information and associated selected content to a camera enabled mobile device from a server based on light source identification codes broadcast from light sources in modulated light, the method including receiving at the server at least one identification code from the camera enabled mobile device, calculating, based on the at least one identification code and on a map that identifies locations of the light sources, indoor position information that identify the location of the camera enabled mobile device within a building, and selecting location specific content that provides information based on the location of the camera enabled mobile device within the building.

Other embodiments disclose a server configured to provide indoor position information and associated selected content to a camera enabled mobile device based on identification codes broadcast from light sources in modulated light, the server including an interface configured to receive at least one identification code from the camera enabled mobile device, a memory that is configured to store identification codes, at least one map, and location specific content, and a module running on a processor that is configured to determine based on the at least one identification code and on a map that identifies locations of the light sources, indoor position information that identifies the location of the camera enabled mobile device within a building and is configured to communicate with memory to retrieve the map and light source identification information as well as location specific content.

DESCRIPTION OF EXAMPLE EMBODIMENTS

Systems and methods are provided that disclose providing a positioning service for devices based on light received from one or more light sources. This light based positioning service uses light information transmitted by each light source to determine the position of the device. The device captures the one or more light sources and is then able to detect the information transmitted by each of the light sources. The light information can include an identification code that is used to identify the position of the light source. By capturing more than one light source on the device the accuracy of the device's position can be improved. The position information can then be used to provide relevant content information to the user. The light sources are each independent beacons that transmit individual identification information through light.

In some embodiments light sources are used to provide an indoor positioning service to mobile devices. Each light source is given an identification code, corresponding to an associated database, which contains information that ties the light source to specific location data. The identification codes are broadcasted through visible light by modulating the LED light source. The modulation occurs at speeds that are undetectable by the human eye, yet appropriate to be received by a camera equipped mobile device. The mobile device receives the identification information, and uses it to lookup its indoor position in the form of location data. Since the identification information is transmitted through visible light, which is highly directional, the mobile device is known to be within the line of sight of the LED light source. Since the indoor position of the LED light source is known from building floor plans and lighting plans, the corresponding indoor position of the mobile device can be determined.

Another embodiment describes a scenario where a mobile device is in view of three or more LED light sources. Each source emits unique identification information, and with knowledge of the relative positions of each LED light source, one can calculate the device's relative position in three dimensions. This process utilizes photogrammetric image processing techniques to identify and calculate coordinates for the positions of the light sources in order to relatively locate the mobile device.

Yet another embodiment describes a system by which a mobile device 103 can receive content based upon identification information received from either one or more LED light sources. The identification information is used to access a database that correlates LED lights and content. An example of such a use case would be a mobile device user in a museum, who receives identification information from a light source illuminating an exhibit, and then uses the received identification information to obtain additional content about the exhibit.

Figure 1:
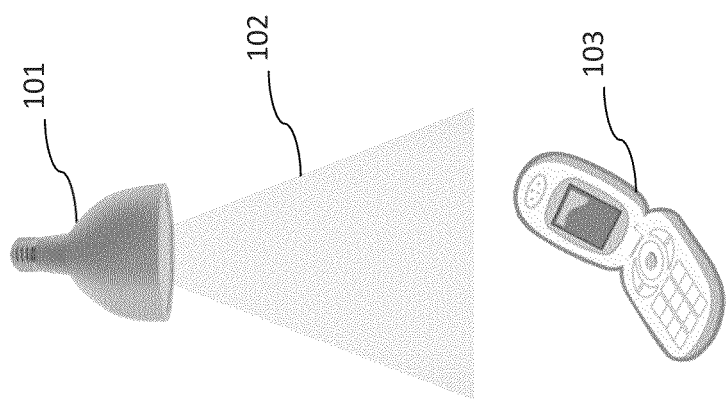
FIG. 1 is a representation of a mobile device receiving light from a LED light source.

FIG. 1 represents a mobile device 103 receiving light 102 from a LED light source 101. The LED light source 101 can be any lighting source used for general purpose, spot illumination, or backlighting. The LED light source can come in several form factors but is not limited to: Edison screw in, tube style, large and small object backlighting, or accent lighting spots and strips. For the purposes of this disclosure, we consider any form of LED light as a potential source capable of transmitting information.

Light 102 is a modulated LED light source 101, and is part of the visible electromagnetic wireless spectrum. LEDs are considered digital devices which can be rapidly switched on and off, to send signals above the rate which the human eye can see. This allows them to be exploited to send digital data through the visible light itself. By modulating the LEDs, turning them on and off rapidly, one can send digital information that is unperceivable to the human eye, but is perceivable by applicable sensors, including but not limited to image sensors and other types of photosensors.

There are many modulation techniques used to send information through light 102. One technique, "On Off Keying" (OOK), is a scheme to transmit digital data by rapidly switching a signal source on and off. OOK is the simplest form of amplitude-shift keying (ASK) which is a modulation technique that represents digital data through either the presence or absence of a carrier wave. When communicating with visible light, the carrier wave takes the form of the transmitted light signal. Therefore at a rudimentary level, when the light signal is turned "on" a digital "one" is perceived, and when the light signal is turned "off" a "zero" is perceived. Furthermore the rate at which the light signal is turned on and off represents the modulation frequency. Note that regardless of changing the modulation frequency, the "carrier wave" remains unchanged as this is an inherent property of the light itself. For example the carrier wave corresponding to a blue light signal is uniquely different than the carrier wave corresponding to a red light signal. While these two signals differ only in the wavelength specific to their perceived color, they can be perceived as two discrete signals.

In addition to OOK, another possible technique is defined as "Digital Pulse Recognition" (DPR). This modulation technique exploits the rolling shutter mechanism of a complementary metal-oxide-semiconductor (CMOS) image sensor. Due to their superior energy efficiency, CMOS sensors are preferred to charged-coupled device (CCD) sensors on mobile devices. When a CMOS image sensor with a rolling shutter takes an image, it does not expose the entire image simultaneously. Instead, the rolling shutter partially exposes different portions of the frame at different points in time. Typically, this causes various unwanted effects: skew, wobble, and partial exposure. In the presence of an LED light driven by a pulse width modulated signal, images received from a CMOS sensor exhibit "residual banding" in the form of visible distortions. The image appears to have alternating dark/white stripes. The stripes are a direct result of the rolling shutter mechanism, and their width is proportional to the frequency of the pulse width modulated (PWM) signal. Higher frequencies correspond to narrower stripes, and lower frequencies result in wider stripes. Practical frequency ranges for use with this technique are between 60 Hz and 5000 Hz. This technique allows one to exploit the rolling shutter mechanism to recover digital data from an optically encoded signal.

DPR has the potential for much higher data rates than both OOK and frequency shift keying (FSK). In FSK and OOK, the camera's frame rate limits the data rate. The highest possible data rate is half of the frame rate, since each symbol spans over two frames. In DPR modulation, a single frame is sufficient for capturing the transmitted symbol. Furthermore, symbols are not "binary"—there are can be as many as 30 different possibilities for a symbol.

In the DPR modulation scheme, image processing is used to measure the stripe width of the recorded image. By successively changing the LED driver frequency for each frame, information is essentially transmitted through recognition of the band widths. In the current design, 10 separate frequencies are used. For a 30 frames per second (FPS) camera, this corresponded to an effective data transfer rate of ~100 bits per second (bps).

Both of these techniques are interesting because they can allow the transmission of information through single color light sources, instead of having to create lighting sources which contain multiple color lights. In the world of LED lighting products, white light is majorly achieved by layering a phosphorous coating on top of blue LEDs. The coating creates the visible perception of "white" light, instead of blue. The alternative to this can be achieved through combining red, green, and blue LED lights; however this approach is expensive and power inefficient as the lumens per watt properties differ between different colored LEDs. Blue LEDs are generally more energy efficient than their red and green counterparts, which is why they are used in most commercial LED lighting products. It is because of this reason that it makes the most sense to use a data modulation technique that uses a single wavelength of light, rather than multiple, because this complies with LED lighting products.

In addition to LED light sources, other types of light sources are also capable of transmitting information through modulation. Alternative incandescent and fluorescent technologies can also be exploited to achieve data transmission, however the circuitry is more complex because the turn on and turn off times of incandescent and fluorescent lights are subject to additional factors.

The modulation frequency of the light source is highly dependent on the receiving circuitry. While incandescent and fluorescent technologies generally do not "flicker" on and off during the course of normal operation, LED lighting sources are sometimes designed to flicker above the rate which the eye can see in order to increase their longevity, and consume less power. Most humans cannot see flicker above 60 Hz, but in rare instances can perceive flicker at 100 Hz to 110 Hz. To combat this, lighting manufactures design flicker above 200 Hz into their lighting products.

Mobile device 103 can be a smart mobile device and is most commonly found in the form of mobile phones, tablets, and portable laptop computers. In order for a mobile device 103 to receive information 102 from the LED light source 101 it has an embedded or attached sensor which is used to receive the incoming light 102 signals. One such sensor is a camera, which has a typical frame refresh rate between fifteen and sixty frames per second (fps). The fps is directly related to the speed at which optical signals can be transmitted and received by the camera. The sensor can capture a number of successive image frames that can later be analyzed to determine if a light source is providing information through light.

Mobile device 103 can include a processor, module, memory, and sensor in order to capture and analyze light received from light sources. The mobile device can analyze the successive image frames captured by the sensor by using the module. The module can be logic implemented in any combination of hardware and software. The logic can be stored in memory and run by processor to modify the successive images and analyze the successive images to determine information encoded in the light of one or more light sources. The module can be built in to the mobile device to provide the capabilities or it can be downloaded and installed. The module can be an application that runs on the mobile device when selected by a user. The module can also be used to receive content and other information related to the position of the mobile device and to provide this content to other modules or to the mobile device.

The reception of optically transmitted information is particularly interesting when used as an indoor positioning system. In a light based positioning system, the physical locations of light sources can be used to approximate the relative position of a mobile device 103 within line of sight. On the mobile side, in addition to a receiving module, the mobile device 103 can use information to determine position of the mobile device. The mobile device can access a data source containing information about where the lights are physically located to determine position. This data source can be stored locally, or in the case where the mobile device 103 has a network connection, the data source could be stored on an external server 703.

For scenarios where a network connection is not available, before entering an indoor space the mobile device 103 could optionally download a "map pack" containing the information used to locate itself indoors, instead of relying on an external server 703. In order to automate this process, the mobile device 103 would first use an alternative existing technique for resolving its position and would use the gained location information to download the appropriate map pack. The techniques for receiving geo-location information include, for example, GPS, GSM, WiFi, user input, accelerometer, gyroscope, digital compass, barometer, Bluetooth, and cellular tower identification information. These techniques can also be used to fill gaps between when a position of the mobile device is determined using the light based technique. For example, a mobile device can be placed at times so its camera does not capture light sources. Between these times these alternative existing techniques can be used for filling in position and location information that can be helpful to the user. The map pack would contain a map 902 of the indoor space the user is entering, locations of the lights from some sort of existing or third party lighting plan 1103, and any location dependent content 903 for the mobile device 103 to consume. Any requests for location information would simply access data stored locally on the mobile device 103, and would not need to access a remote server via a network 601.

In terms of the experience when using a light based positioning system, the indoor location reception and calculation can happen with little to no user input. The process operates as a background service, and reads from the receiving module without actually writing them to the display screen of the mobile device. This is analogous to the way WiFi positioning operates, signals are read in a background service without requiring user interaction. The results of the received information can be displayed in a number of ways, depending on the desired application. In the case of an indoor navigation application, the user would see an identifying marker overlaid on a map of the indoor space they are moving around in. In the case of content delivery, the user might see a mobile media, images, text, videos, or recorded audio, about the objects they are standing in front of.

Figure 2:
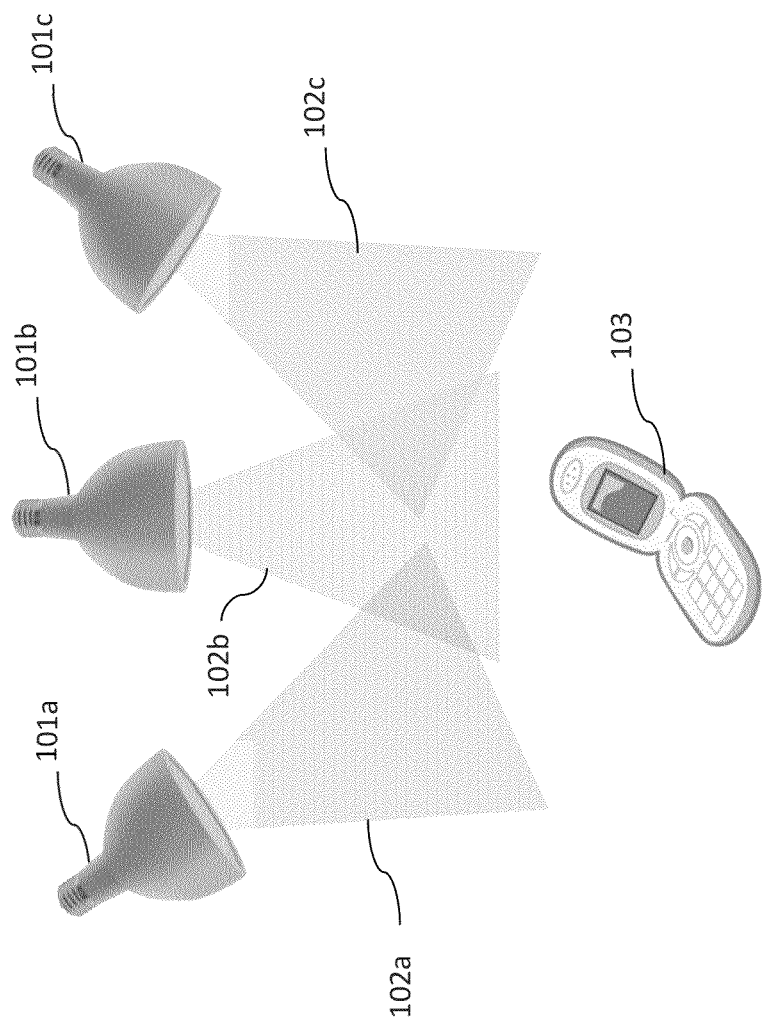
FIG. 2 is a representation of a mobile device receiving multiple sources of light simultaneously from multiple LED light sources.

In scenarios where the mobile device 103 is in view of several light sources, it can receive multiple signals at once. FIG. 2 is a representation of a mobile device 103 receiving identification information 102*a*-102*c* from multiple LED light sources 101*a*-101*c*. Each light source is transmitting its own unique piece of information. In order to identify its position or receive location based content, the mobile device 103 can then use the received information to access a database 802 containing information about the relative positions of the LED light sources 101a-101c and any additional content 903. When three or more sources of light are in view, relative indoor position can be determined in three dimensions. The position accuracy decreases with less than three sources of light, yet remains constant with three or more sources. With the relative positions of lights 101a-101c known, the mobile device 103 can use photogrammetry to calculate its position, relative to the light sources.

Photogrammetry is a technique used to determine the geometric properties of objects found in photographic images. In the context of locating mobile devices using light sources, photogrammetry refers to utilizing the corresponding positions of LED light sources, and their positions in 3-D space, to determine the relative position of a camera equipped mobile device. When three unique sources of light are seen by the camera on a mobile device, three unique coordinates can be created from the various unique combinations of 101a-101c and their relative positions in space can be determined.

For a mobile device 103 equipped with an image sensor we can consider the following scenario. When multiple LED light sources appear in the image sensors field of view, the sources appear brighter relative to the other pixels on the image. Thresholds can then be applied to the image to isolate the light sources. For example, pixel regions above the threshold are set to the highest possible pixel value, and the pixel regions below the threshold are set to the minimum possible pixel value. This allows for additional image processing to be performed on the isolated light sources. The end result is a binary image containing white continuous "blobs" where LED light sources are detected, and dark elsewhere where the sources are not detected.

A blob detection algorithm can then be used to find separate LED light sources. A minimum of three separate LED blobs are used to resolve the 3-D position of a mobile device 103. Each LED blob represents a "region of interest" for the information reception, and is simultaneously transmitting a unique piece of information via the modulated visible signal from the light source. For the purposes of reception, each region of interest is processed independently of other regions of interest and is considered to be uniquely identifiable. A center of mass calculation for each region can be performed to determine the pixel coordinates of the center of each LED light source. This center of mass calculation is performed for each frame to track the regions of interest as they move around the image.

Once the regions of interest are established, a detection algorithm captures multiple image frames for each region of interest in order to receive the visible light signal contained in each blob. For each frame in a detected region of interest, a threshold algorithm determines whether the frame contains a "1" (in the case of an aggregate pixel value above the threshold), or a "0" (in the case of an aggregate pixel value lower than the threshold). The threshold algorithm is used since the communication is asynchronous, so the camera receiver period may overlap between the transmission of a "1" and a "0" from the LED light source.

The result of converting successive image frames in a region of interest to binary values is in essence a down sampled digital version of the signal received from the LED light source. Next demodulation of the down-sampled digital signal is used to recover the transmitted bits. This down sampling is used due to the fact that the signal modulation frequency should be above the rate at which the human eye can see, and the image sensor frame rate is typically limited to 15-30 fps.

At a lower level, the mobile device 103 processes data on a frame-by-frame basis. Each frame is split into separate regions of interest, based on the detection of light sources. For each region of interest, a thresholding algorithm is used to determine whether a given region is "on" or "off". This is done by taking the average pixel value for the region and comparing it to the threshold value. If the region is "on", the demodulator assumes the light source has just transmitted a "1". If the region is "off", the demodulator assumes the light source has sent a "0". The result of this is the equivalent of a 1-bit analog-to-digital conversion (ADC), at a sampling rate which is equal to the frame rate of the camera.

After a frame is processed, the results of the ADC conversation are stored in a circular buffer. A sliding correlator is applied to the buffer to look for the presence of start bits 402. If start bits 402 are found, the demodulation algorithm assumes it is reading a valid packet of information 401 and proceeds to capture the rest of the transmission. Two samples are used for each bit, so the algorithm creates a linear buffer that is twice the size of the remaining packet. Each subsequent ADC is written sequentially to the linear buffer. When the linear buffer is filled, the demodulation algorithm performs a fast fourier transform (FFT) on the buffer to recover the transmitted signal.

Figure 3:
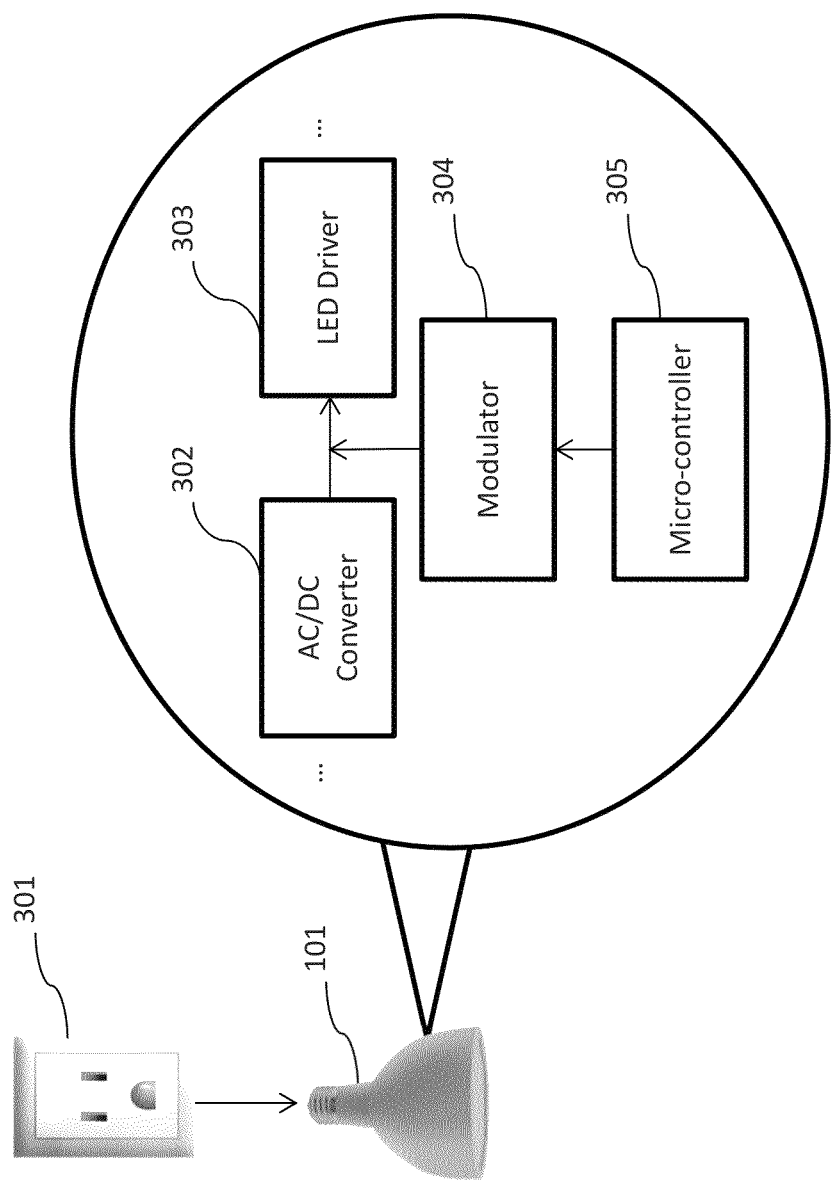
FIG. 3 is a representation of the internal components commonly found in a LED light source that is capable of being modulated to send digital data.

FIG. 3 describes internal components commonly found in LED light source 101 with the addition components to allow for the transmission of optical signals. The LED light source 101 contains an alternating current (AC) electrical connection 301 where it connects to an external power source, an alternating current to direct current (AC/DC) converter 302 which converts the AC signal from the power source into an appropriate DC signal, a modulator 304 which interrupts power to the LEDs in order to turn them on and off, a microcontroller 305 which controls the rate at which the LEDs are modulated, and a LED driver circuit 303 which provides the appropriate amount of voltage and current to the LEDs.

Electrical connection 301 is an electrical source that is used to supply power to the LED light source 101. This most commonly comes in the form of a 120 Volt 60 Hz signal in the United States, and 230 Volt 50 Hz in Europe. While depicted in FIG. 3 as a three pronged outlet, it can also take the form of a two terminal Edison socket which the bulb is screwed into, or a bundle of wires containing a live, neutral, and or ground. When considering other forms of lighting such as backlighting and accent lighting, the electrical connection can also come in the form of a DC source instead of an AC source.

Most LED light sources contain an AC/DC converter 302 which converts the alternating current from the power source 301, to a direct current source used internally by the components found inside the bulb or light source. The converter takes the alternating current source commonly found in existing lighting wiring, and converts it to a direct current source. LED light sources generally use direct current, therefore an AC/DC converter is found in most lighting products regardless of form factor.

LED driver 303 provides the correct amount of current and voltage to the LEDs contained inside the lighting source. This component is commonly available, and can have either a constant current or constant voltage output. The LEDs found inside most lighting sources are current controlled devices, which require a specific amount of current in order to operate as designed. This is important for commercial lighting products because LEDs change color and luminosity in regards to different currents. In order to compensate for this, the LED driver circuitry is designed to emit a constant amount of current while varying the voltage to appropriately compensate for the voltage drops across each LED. Alternatively, there are some high voltage LEDs which require a constant voltage to maintain their color and luminosity. For these cases the LED driver circuitry provides a constant voltage while varying the current.

Modulator 304 serves the function of modulating the LED light source 101 on and off to optically send light 102 signals. The circuits comprising the modulator can simply consist of solid state transistors controlled by a digital input. In essence the modulator 304 turns the LEDs on and off by allowing or preventing current flow. When current flows through the modulator with the switches closed the LEDs turn on, and when the switches are open in the modulator no current can flow and the LEDs turn off. When the modulator is controlled by an additional logic component, it has the ability to send repeating patterns of on/off signals in order to transmit digital data through the visible light 102. The modulator interfaces directly in between the AC/DC converter 302 and the LED driver 303, and is controlled by a microcontroller 305.

The microcontroller 305 provides the digital input signal to the modulator unit 304. This function can also be achieved using a field programmable gate array (FPGA), but typically consumes more power with added complexity. The microcontroller's 305 task is to send a pre-determined sequence of signals to the modulator 304 which then interfaces with the LED driver 303 to modulate the outgoing visible light from the LED source 101. The microcontroller contains a nonvolatile memory storage area, which stores the identification code of the light signal. Examples of possible nonvolatile memory sources include programmable read only memory (PROM), electrically erasable programmable read only memory (EEPROM), or Flash.

In regards to the microcontroller pins, the microcontroller 305 contains a digital output pin, which is used to modulate the light output. To generate the output signal waveforms, timer modules within the microcontroller 305 are used. Typical logic levels for the digital output are 3.3V and 5V. This digital output feeds into the modulator 304 which interrupts the driver circuit 303 for the LED light source 101. Alternatively, if the LED light source requires lower power, such as backlighting or individual LED diodes, the output of the microcontroller 305 could also be used to drive the light sources directly.

Figure 4:
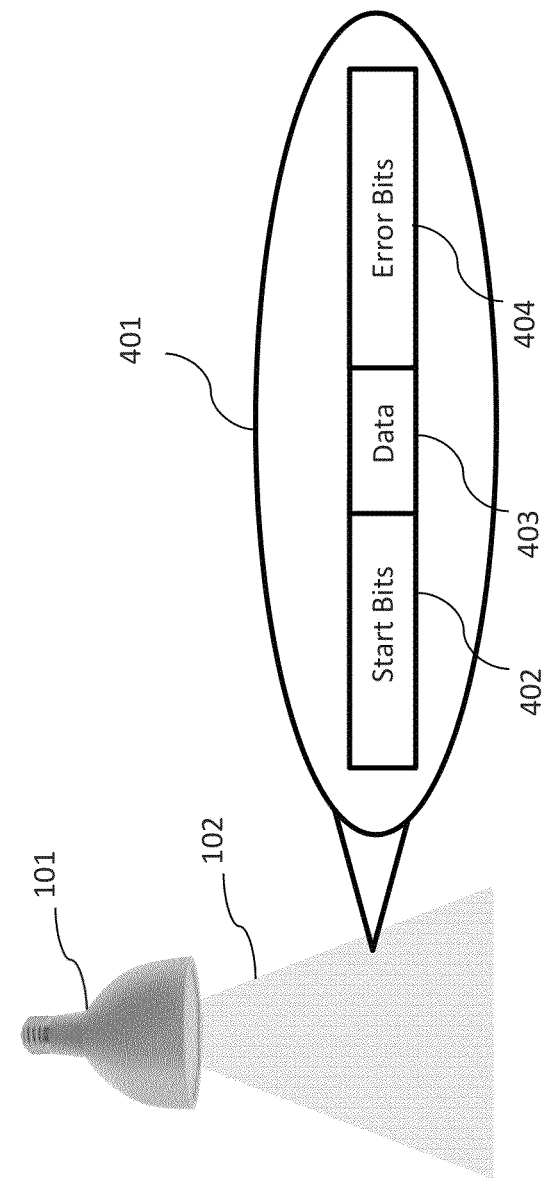
FIG. 4 illustrates information which can be optically transmitted from an LED light source.

The sequence of signals sent from the microcontroller 305 determines the information which is transmitted from the LED light source 101. FIG. 4 describes the information 401 format of the optically transmitted information from the light 102. At the highest level, each packet of information contains some sort of starting bit sequence, which indicates the beginning of a packet, followed by data 403, and some sort of error detection identifier. The size and position of each portion of information is dependent on the application and is also constrained by requirements of the receiving device.

Each packet of information 401 transmitted from the LED light source 101 contains a sequence of starting bits 402, followed by data 403, and then terminated with an error detection code 404. Since the LED light sources 101 are continually broadcasting information 401, erroneous packets are simply discarded while the receiver listens for the starting bits 402, indicating the beginning of the next packet. In cases where multiple sources of light are observed by a mobile device 103, multiple pieces of information 401 are received simultaneously.

Information 401 describes the encoded information that is transmitted by the LED light source 101. The information 401 is contained in a packet structure with multiple bits which correspond to numeric integer values. The data 403 portion of the information packet can include unique ID codes 701. Currently the data 403 size is set to 10 bits, but can be of varying length. Each bit represents a binary "1" or "0", with 10 bits of data 103 corresponding to 1024 possible values. This corresponds to 1024 unique possibilities of ID codes 701 before there is a duplicate. The ID code can include location information in the ID code that provides a general indication of geographical location of the light. This geographical location information can be used to more quickly locate light source information that is used in determining indoor positioning on the mobile device. For example, the geographical information can point to a database to begin searching to find relevant information for positioning. The geographical information can include existing location identifiers such as area code, zip code, census tract, or any other customized information.

The ID code 701 is static and is assigned during the calibration phase of the LED light source 101 during the manufacturing process. One method to assign the ID code 701 is to place instructions to generate a random code in the nonvolatile memory. Once the LED light source 101 is powered on the microcontroller reads the ID code 701 from the nonvolatile memory storage area, and then uses this code for broadcasting each and every time it is subsequently powered on. Since the ID code 701 is static, once it is assigned it will be forever associated locally to the specific LED light source 101 which contains the microcontroller 305.

Figure 5:
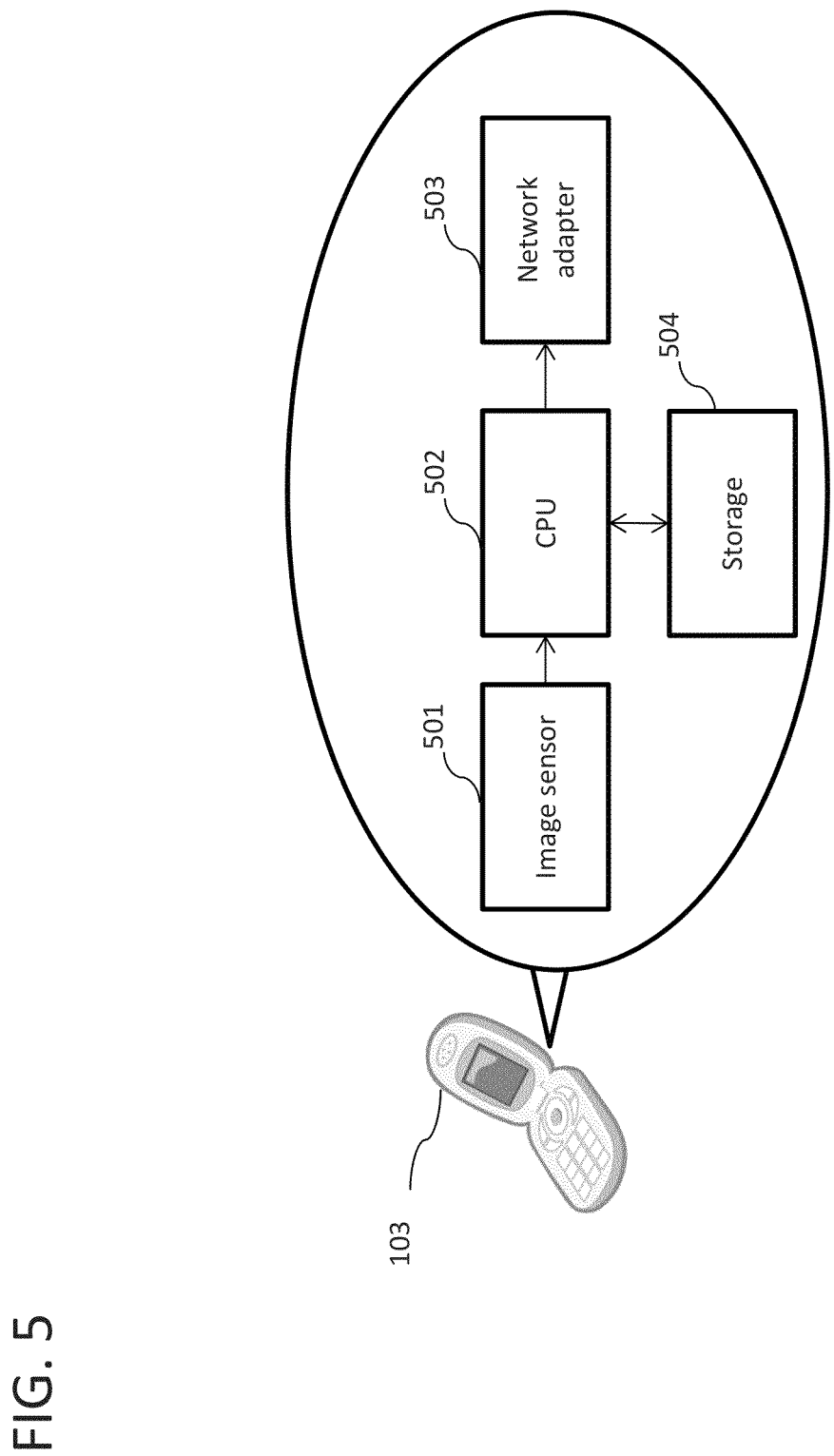
FIG. 5 is a representation of the components which are commonly found in mobile devices which enable them to receive optical signals from LED sources.

FIG. 5 describes the components found in mobile devices 103 that are capable of receiving optical information. At the highest level the mobile device contains an image sensor 501 to capture optically transmitted information, a central processing unit 502 to decipher and manage received information, and a network adapter 503 to send and receive information.

Photosensors are devices which receive incoming electromagnetic signals, such as light 102, and convert them to electrical signals. In a similar fashion, image sensors are arrays of photosensors which convert optical images into electronic signals. The ability to receive signals from multiple sources is an important benefit when using image sensors for receiving multiple optical signals.

Image sensor 501 is a typical sensor which is found in most smart devices. The image sensor converts the incoming optical signal into an electronic signal. Many devices contain complementary metal-oxide-semiconductor (CMOS) image sensors, however some still use charge-coupled devices (CCD). CMOS image sensors are the more popular choice for mobile devices due to lower manufacturing costs and lower power consumption. There are several tradeoffs to consider when choosing an image sensor to perform photogrammetry on multiple LED light sources 101. One tradeoff between the camera resolution and the accuracy of the photogrammetric process when triangulating between multiple light sources—increasing the number of pixels will increase the accuracy. There is also another tradeoff between the data rate of the transmission and the sampling rate (in frames per second) of the camera. The data rate (in bits/second) is half the frame rate of the camera (e.g., a 30 fps camera will receive 15 bps). And finally when determining the length of the information 401 packet, the larger the size the longer the reception period—as more bits generally requires longer sampling periods to capture the full message.

CPU 502 is a generic CPU block found in most smart devices. The CPU 502 is in charge of processing received information and sending relevant information to the network adapter 503. Additionally the CPU has the ability to read and write information to embedded storage 504 within the mobile device 103. The CPU 502 can use any standard computer architecture. Common architectures for microcontroller 503 devices include ARM and x86.

The network adapter 503 is the networking interface that allows the mobile device 103 to connect to cellular and WiFi networks. The network connection is used in order for the mobile device 103 to access a data source containing light ID codes 701 with their corresponding location data 702. This can be accomplished without a data connection by storing location data 702 locally to the mobile device's 103 internal storage 504, but the presence of a network adapter 503 allows for greater flexibility and decreases the resources needed. Furthermore, the network adapter 503 is also used to deliver location dependent content to the mobile device when it is connected to a larger network 601.

Figure 6:
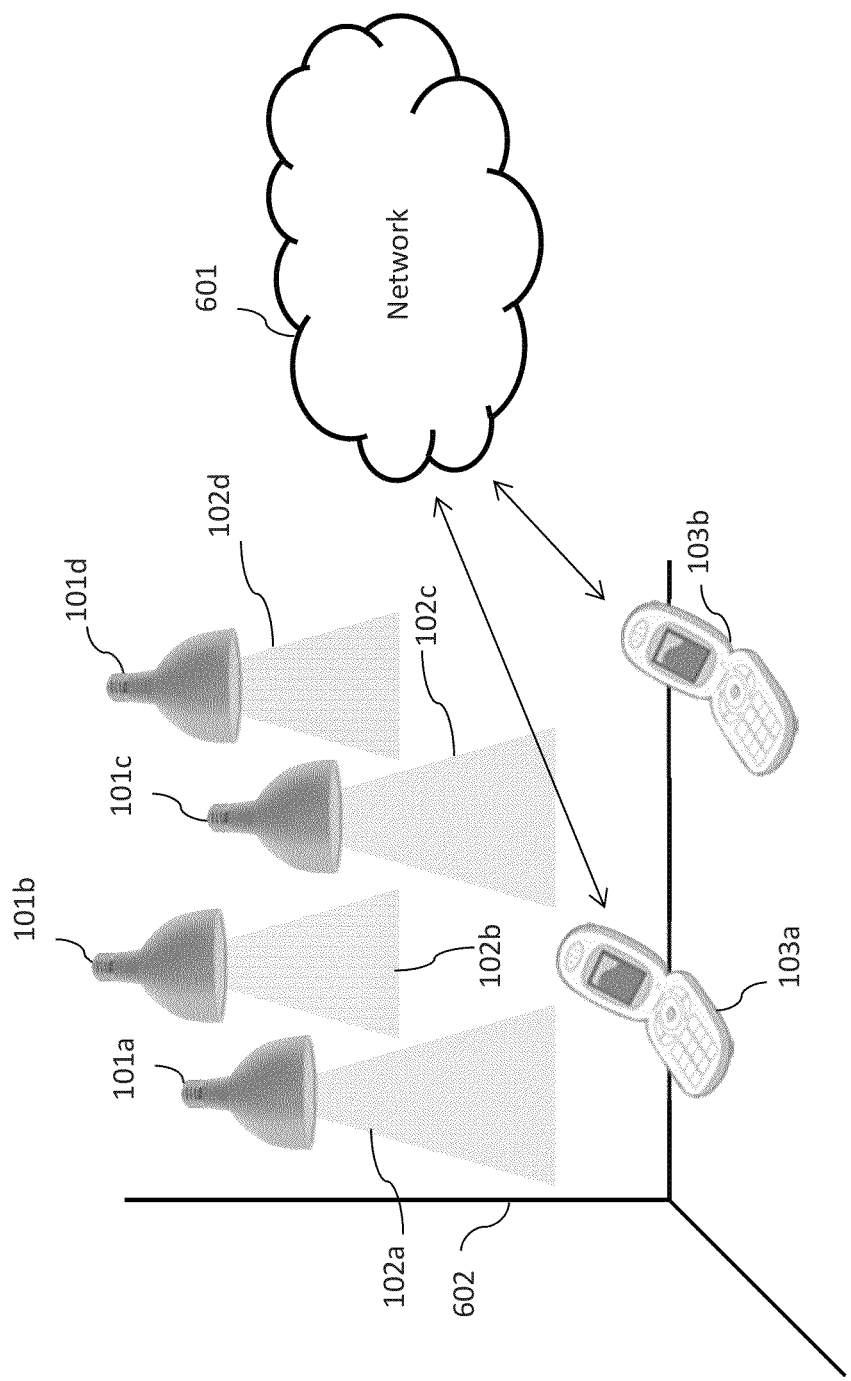
FIG. 6 is a representation of multiple LED light sources sending unique information to multiple mobile devices.

FIG. 6 is a representation of multiple LED sources sending light 102*a-d* containing identification information 102 to multiple mobile devices 103*a*-103*b*. In this instance the light sources are acting as non-networked broadcast beacons; there are no networking modules or physical data wires connecting them. This property is desirable when looking towards a commercial installation of numerous LED light sources 103*a*-103*b*, as additional wiring and networking will not be required. However, in order to receive relevant information the mobile devices have the ability to send and receive additional information from a local source or a network 601. Once the mobile device 103 receives identification information 401 from the light sources, it then asks a local or remote source for additional information.

Enclosed area 602 is a spatial representation of an enclosed room containing four LED sources 101*a*-101*d* and two mobile devices 103*a*-103*b*, meaning that they can operate next to each other without interference. As a rule of thumb if the received image feed from the mobile device sees one or more distinct bright sources of light, it has the ability to differentiate and receive the unique information without interference. Because the light capture is based on line of sight interference is mitigated. In this line of sight environment, interference can arise when light capture mechanism of the mobile device is blocked from the line of sight view of the light source.

Network 601 represents a data network which can be accessed by mobile devices 103*a*-103*b* via their embedded network adapters 503. The networked can consist of a wired or wireless local area network (LAN), with a method to access a larger wide area network (WAN), or a cellular data network (Edge, 3G, 4G, LTS, etc). The network connection provides the ability for the mobile devices 103*a*-103*b* to send and receive information from additional sources, whether locally or remotely.

Figure 7:
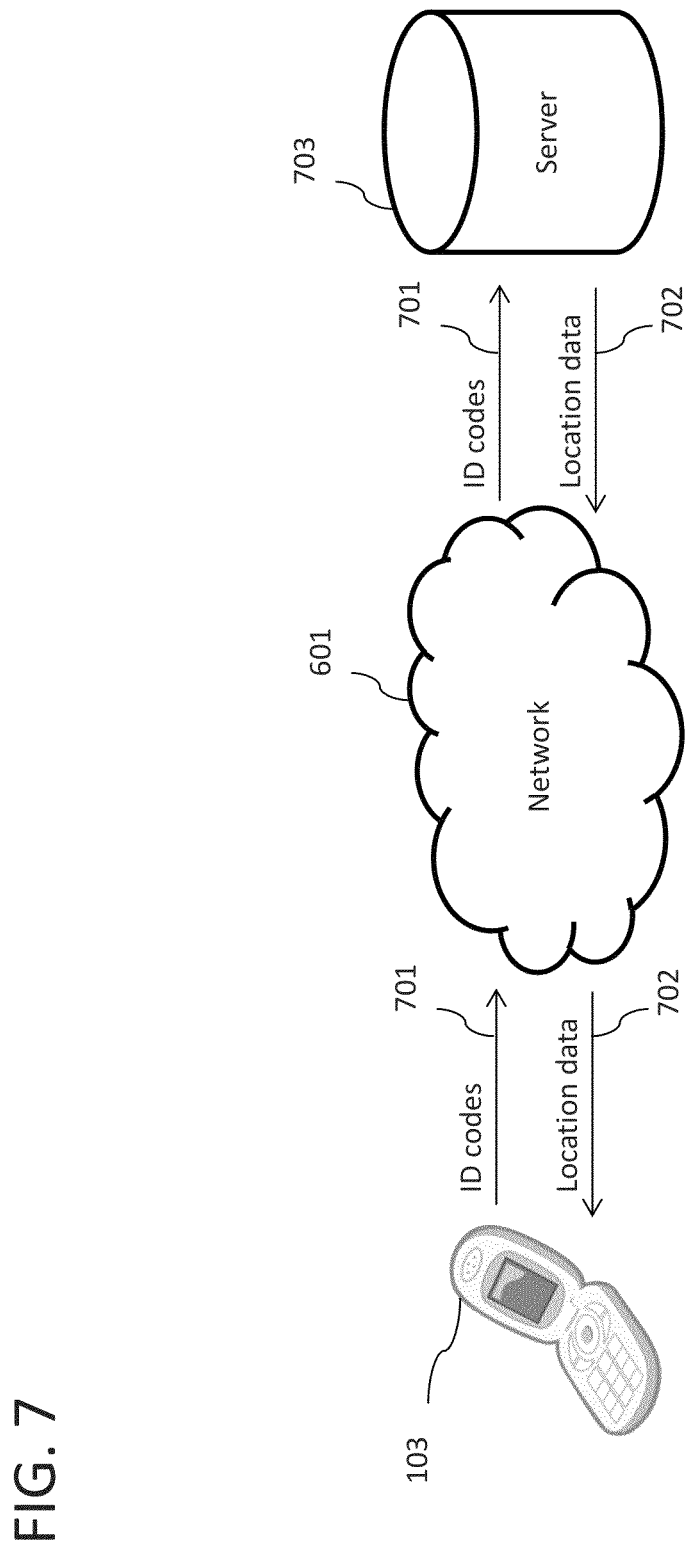
FIG. 7 illustrates the process of a mobile device sending identification information and receiving location information via a network to a server.

FIG. 7 describes how the mobile device 103 receives location data 702. In essence, the mobile device 103 sends decoded ID codes 701 through a network 601 to a server 703, which sends back location information 702. The decoded ID codes 701 are found in the information 401, which is contained in the optically transmitted signal. After receiving this signal containing a unique ID code 701 the mobile device 103 sends a request for location data 702 to the server 703, which sends back the appropriate responses. Additionally the request could include other sensor data such as but not limited to GPS coordinates and accelerometer/gyroscope data, for choosing between different types of location data 702 and any additional information.

Location data 702 is the indoor location information which matches the received information 401. The location data 702 corresponds to indoor coordinates which match the ID code 701, similar to how outdoor GPS tags known locations of interest with corresponding information. The location data 702 could also contain generic data associated with the light identification information 401. This could include multimedia content, examples of which include recorded audio, videos, and images. The location data 702 can also vary depending on other criteria such as temporal criteria, historical criteria, or user-specified criteria, for example.

The temporal criteria can include the time of day. The historical criteria can include user location history (e.g., locations visited frequently), Internet browsing history, retail purchases, or any other recorded information about a mobile device user. The user-specified criteria can include policies or rules setup by a user to specify the type of content they wish to receive or actions the mobile device should take based on location information. For example, the user-specified criteria can include how the mobile device behaves when the user is close to an item that is on sale. The user may specify that a coupon is presented to the user, or information about the item is presented on the mobile device. The information about the item can include videos, pictures, text, audio, and/or a combination of these that describe or relate to the item. The item can be something that is for sale, a display, a museum piece, or any other physical object.

Server 703 handles incoming ID codes 701, and appropriately returns indoor location data 702 to the mobile devices 103. The handling can including receiving incoming ID codes, searching databases to determine matches, calculating position coordinates based on the ID codes, and communicating indoor location data 702. Since the LED light sources 101 are acting as "dumb" one way communication beacons, it is up to other devices to determine how to use the ID codes to calculate position information and deliver related content. In some embodiments, the server 703 can include the information used to link ID codes 701 to physical spaces and to deliver location specific content. The server is designed to handle the incoming requests in a scaleable manner, and return results to the mobile devices in real-time.

The server can include one or more interfaces to the network that are configured to send and receive messages and information in a number of protocols such as Internet Protocol (IP) and Transmission Control Protocol (TCP). The protocols can be arranged in a stack that is used to communicate over network 601 to mobile device 103. The server can also include memory that is configured to store databases and information used in providing position coordinates and related location based content. The server can include one or more modules that can be implemented in software or other logic. These modules can perform calculations and perform operations to implement functionality on the server. The server can use one or more processors to run the modules to perform logical operations.

Figure 8:
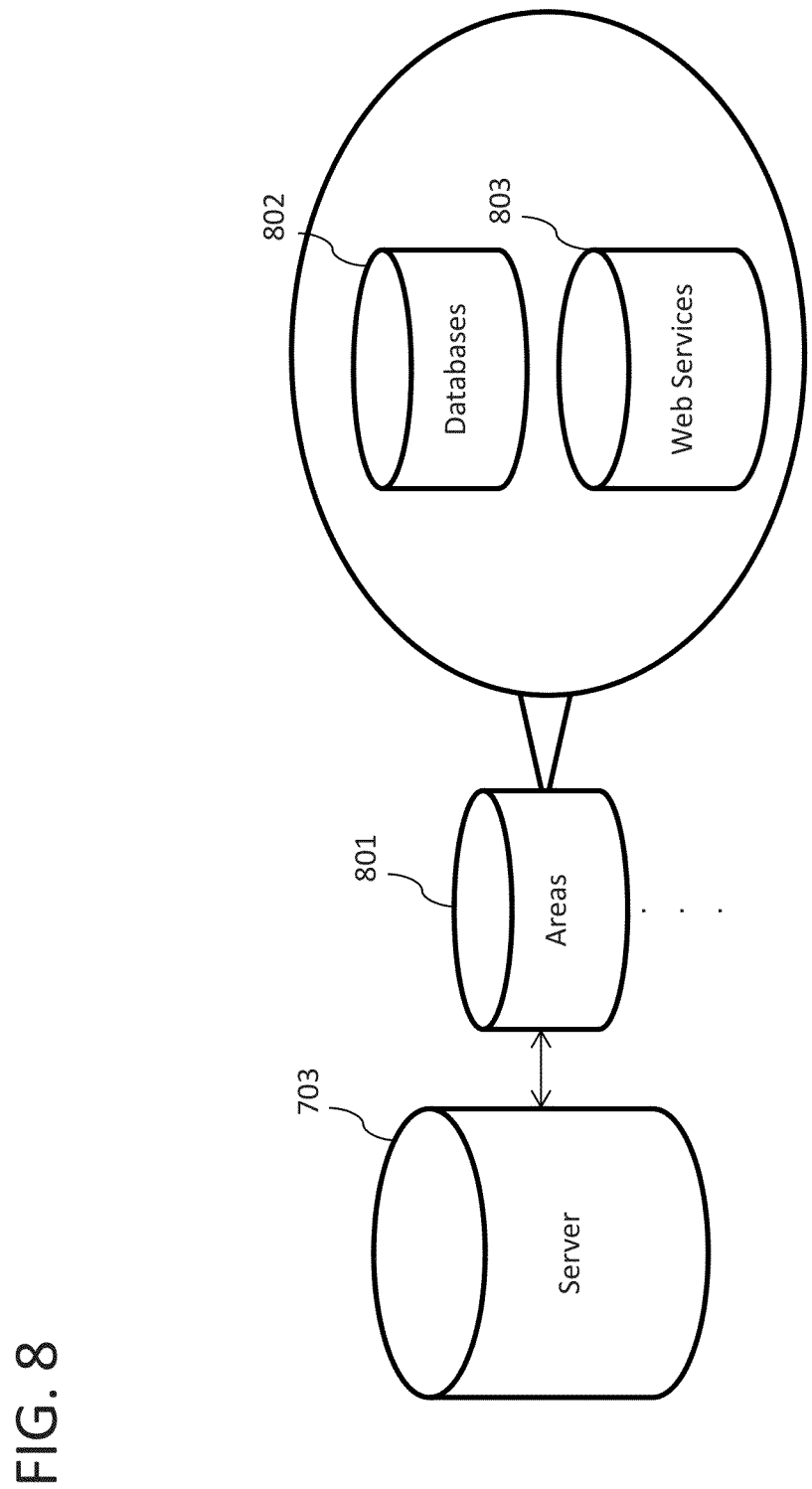
FIG. 8 illustrates the high level contents of the server which includes databases and web services for individual areas enabled with light positioning systems.

To describe the server interaction in more detail, FIG. 8 delves into location specific areas 801 containing databases 802 and web services 803. The areas 801 represent a subset databases 802 and web services 803 for individual locations where there are installed LED light sources 101. The server 703 directly communicates with these installations, which have their own separate sets of information. At a high level, databases 802 represent the stored information pertaining to a specific area 801, while the web services 803 represent services which allow users, customers, administrators, and developers access to the ID codes, indoor locations, and other information.

In order to send relevant information, after each received ID code 701, the server 703 requests information pertaining to the specific area 801. Contained in each area 801, are databases which contain information corresponding to the specific ID code 701. This information can take multiple formats, and has the ability to be content specific to a variety of static and dynamic parameters.

In order to optimize response time, the server 703 can constrain its search space by using existing positioning technologies available to the mobile device 103 or from information in the light source ID code depending on the embodiment. In essence the server looks for the lights IDs 901 within a specific radius of the current approximate position of the mobile device 103, and ignores those that are geographically irrelevant. This practice is known as "geo-fencing", and dramatically reduces the request/response time of the server 703. As final verification, if the database 802 contains one or more of the same IDs within the current search space that match the ID codes received by the mobile device 103 within a specific time frame, then a successful transaction can be assumed.

Figure 9:
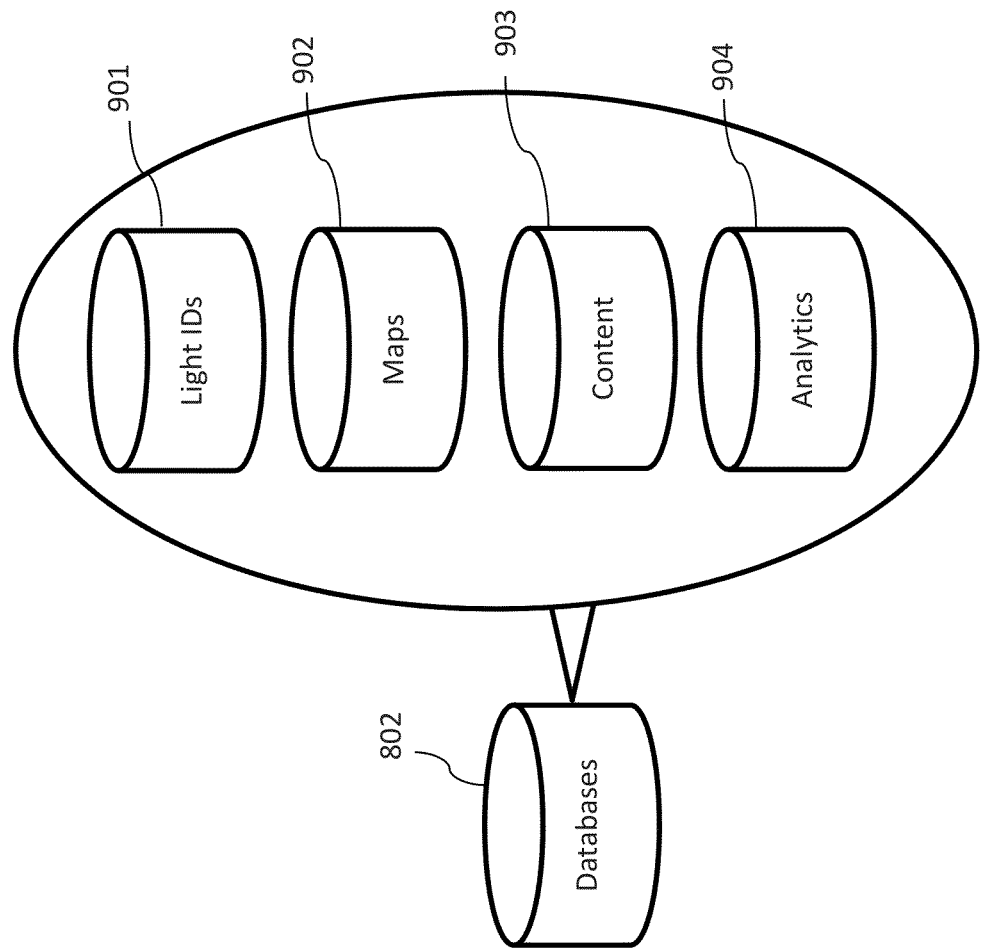
FIG. 9 illustrates the components inside the databases.

As seen in FIG. 9, each database 802 contains numerous sub categories which store specific types of information. The categories are labeled light IDs 901, maps 902, content 903, and analytics 904.

Light IDs 901 is a category which contains records of the individual light ID codes 701 which are contained in an area 801. In a typical light positioning enabled installation, there will be tens to hundreds of unique LED light sources 101 broadcasting unique ID codes 701. The purpose of the light IDs 901 database is to maintain and keep a record of where the ID codes 701 are physically located in the area 801. These records can come in form of but are not limited to GPS (latitude, longitude, and altitude) coordinates which are directly mapped into an indoor space. For instance, most indoor facilities have information about the number of installed lights, how far apart they are spaced, and how high the ceilings are. You can then match this information with building floor plans or satellite imagery to create a digital mapping of where each light is positioned.

To expand upon the Light IDs 901 category, additional information can come in the form of location specific maps 902. These maps can take on many physical and digital forms, either directly from the management of the location, or a third party vendor or outside source. In addition to mapping information, location specific content 903 and analytics 904 are also contained inside the databases 802.

Figure 10:
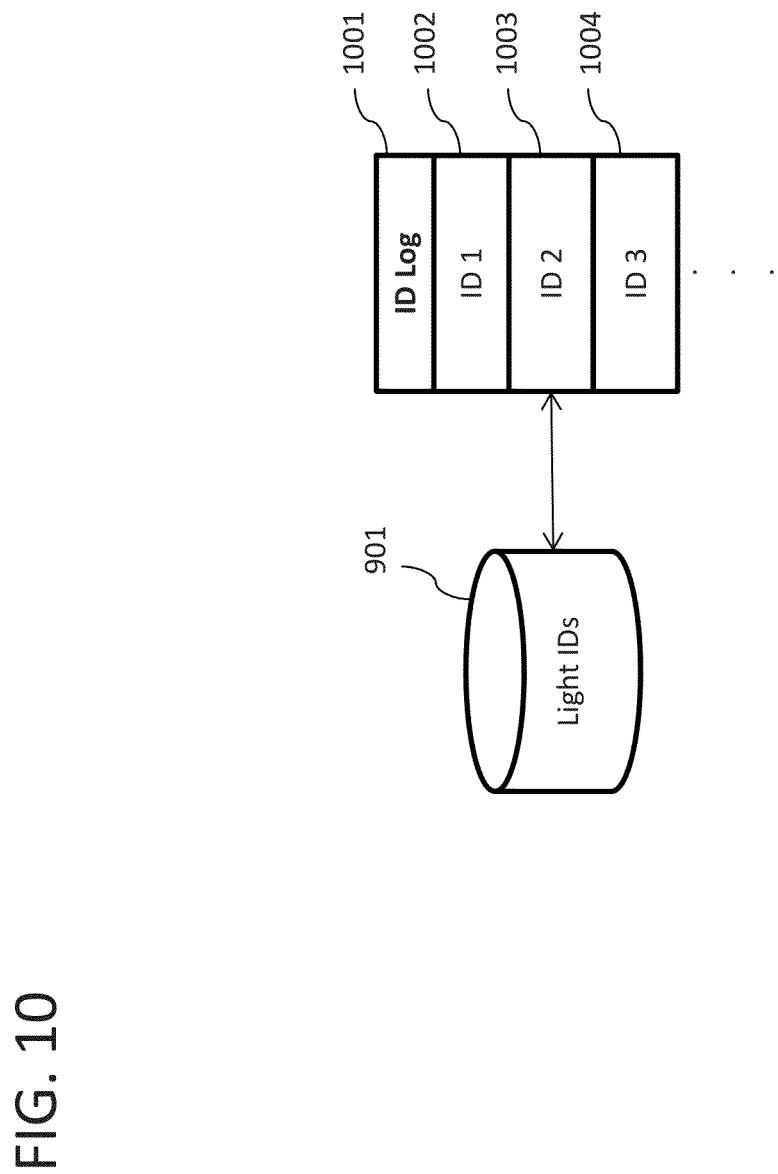
FIG. 10 illustrates the information contained in the Light IDs database.

FIG. 10 is a description of the ID log 1001 information contained in the Light IDs database 901. It is a representation of the file structure that contains individual records corresponding to individual light ID codes 701 found within different areas 801. In a typical area 801 there is a possibility of having duplicate ID codes 701 since there are a finite number of available codes. The size of the ID code 701 is proportional to the length of the data 403 field contained in the optical information 401.

To deal with duplicate ID Codes 701, additional distinguishing information can be contained inside of the individual log records; ID 1 1001, ID 2 1003, and ID 3 1004. This information can contain additional records about neighboring ID Codes 701 which are in physical proximity of the LED light source 101, or additional sensor data including but not limited to: accelerometer or gyroscope data, WiFi triangulation or fingerprinting data, GSM signature data, infrared or Bluetooth data, and ultrasonic audio data. Each additional sensor is an input into a Bayesian model that maintains an estimation of the current smartphone position and the uncertainty associated with the current estimation. Bayesian inference is a statistical method used to calculate degrees of probability due to changes in sensory input. In general, greater numbers of sensory inputs correlate with lower uncertainty.

In order to calibrate the light based positioning system, a user equipped with a specific mobile application will need to walk around the specific area 801. The mobile application contains map 902 information of the indoor space, with the positions of the LED light sources 101 overlaid on the map. As the user walks around, they will receive ID codes 701 from the lights. When the user receives an ID code 701, they will use the map on the mobile app to select which LED light source 101 they are under. After the user confirms the selection of the light, the mobile application sends a request to the server 703 to update the light location contained in the lighting plan 1103 with the ID code 701. Additional user provided 1104 metadata including but not limited to current WiFi access points, RSSI, and cellular tower information can also be included with the server request to update additional databases.

In addition to manual calibration, calibration of LED light source 101 locations can also be achieved via crowd-sourcing. In this algorithm, as mobile application users move around an indoor space receiving ID codes 701, they will send requests to the server 703 containing the light ID code 701 received, the current approximate position (based on other positioning techniques such as WiFi, GPS, GSM, and inertial sensors) and the error of the current approximation. Given enough users, machine learning algorithms on the server 703 can be used to infer the relative position of each LED light source 101. The accuracy of this calibration method depends heavily on the number of mobile application users.

Figure 11:
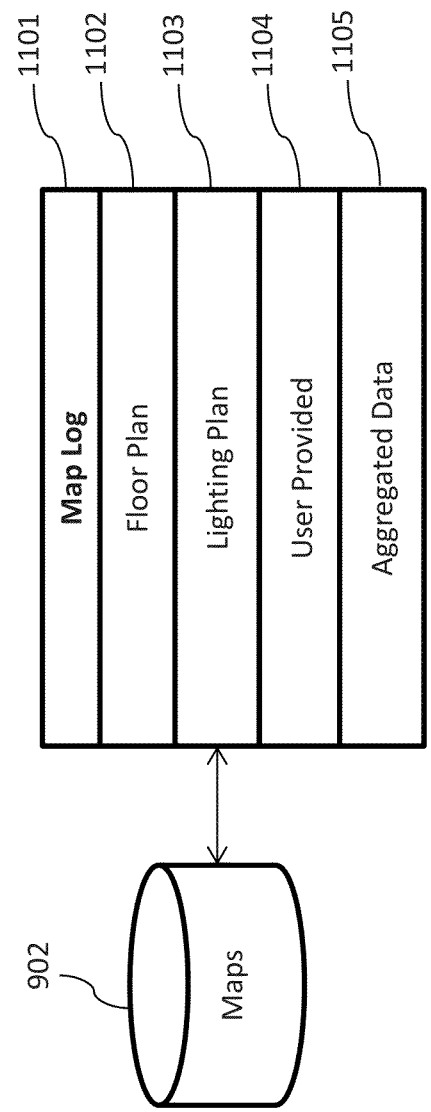
FIG. 11 illustrates the information contained in the Maps database.

FIG. 11 is a description of the maps database 902 and map log 1101 information containing floor plans 1102, lighting plans 1103, user provided information 1104, and aggregated data 1105. Map log 1101 is a representation of the file structure that contains the information found inside the maps database 902. Information can come in the form of but is not limited to computer aided drafting files, user provided computerized or hand drawn images, or portable document formats. The information residing in the maps 902 database can both be used to calibrate systems of multiple LED light sources 101, and to augment the location data 702 that is sent to mobile devices 103.

Floor plan 1102 contains information about the floor plan for specific areas 801. The contained information can be in the form of computer aided drafting files, scanned images, and legacy documents pertaining to old floor plans. The information is used to build a model corresponding to the most recent building structure and layout. These models are subject to changes and updates through methods including but not limited to crowd sourcing models where users update inaccuracies, third party mapping software updates, and additional input from private vendors.

Lighting plan 1103 contains information about the physical lighting fixture layout, electrical wiring, and any additional information regarding the lighting systems in the area 801. This information can also come in a variety of physical and digital forms such as the floor plan 1102 information. The lighting plan 1103 information is used in the calibration process of assigning light ID codes 701 to physical coordinates within an area 801. In essence, a location with multiple LED light sources 101 acts a large mesh network except in this case each node (light ID 701) is a non-networked beacon of information that does not know about its surrounding neighbors. To help make sense of multiple light ID codes 701, the lighting plan 1103 information is used as one of many ways to tell the backend server 703 where LED light sources 101 are located.

User provided information 1104 contains additional data that the user manually uploads in regards to building changes, updates, or new information that is acquired. The user in this case is most likely the facility manager or staff member, but could also originate from an end user of the system who contributes via a crowd sourcing or machine learning mechanism. For instance, if an end user was using a light based positioning system in a museum and was unable to find a particular exhibit or noticed inaccurate information in regards to location or classification of the exhibit, they could red flag the occurrence using their mobile device 103. When coupled with data from additional users, sometimes known as a crowd sourcing method, this user provided information 1104 can be used to update and repair inaccuracies in the maps 902 database.

Aggregated data 1105 contains information that is gathered by the system that can be used to augment the current information that is known about the mapping environment. This can occur during normal operation of the system where multiple mobile devices 103 are constantly sending and receiving location data 702 from the server 703. Over time the aggregation of this data can be used to better approximate how light ID codes 701 correspond to the physical locations of the LED light sources 101. For instance if multiple mobile devices 103 consistently receive a new ID code 701, in a repeatable pattern with respect to additional known ID codes 701 and other sources of location information, then this information can be recorded and stored in the aggregated data 1105 database. This information can additionally be used to recalibrate and in essence "self-heal" a light based positioning system.

Figure 12:
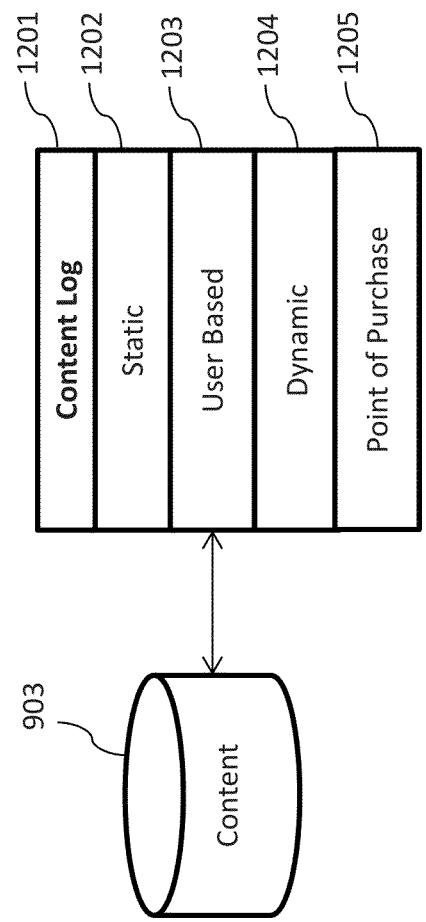
FIG. 12 illustrates the information contained in the Content database.

FIG. 12 is a description of the content database 903 and content log 1201 information containing static content 1202, user based content 1203, and dynamic content 1204. Content log 1201 is a representation of the file structure that contains the information found inside the content database 903. Static content 1202 refers to unchanging information that is associated with the specific area 801. This can refer to the previous example where a facility manger loads specific content into the content 903 database before a user enters the specific area 801. This type of information can take the form of but is not limited to audio recordings, streaming or stored video files, images, or links to local or remote websites.

User based content 1203 refers to content that is dependent on user criteria. The content can depend on but is not limited to user age, sex, preference, habits, etc. For instance, a male user might receive different advertisements and promotions than a female world. Additionally age and past purchase habits could also be used to distinguish which is the correct piece of content to be presented to the user.

Dynamic content 1204 refers to content which changes with varying frequency. The content can change dependent on a temporal bases, daily, weekly, monthly, etc. For instance, seasonal marketing and content could be automatically presented to the user dependent on the month of the year, or content in the form of morning, evening, or nightly specials could be presented numerous times throughout the individual day.

In addition to content, point of purchase 1205 information can be delivered as well. This could be implemented by using the received ID code 701 to a secure connection which establishes and completes a transaction linked to a user's selected payment method. Additionally, a standalone point of purchase feature could be implemented by simply linking ID codes 701 directly to merchandise or services.

Figure 13:
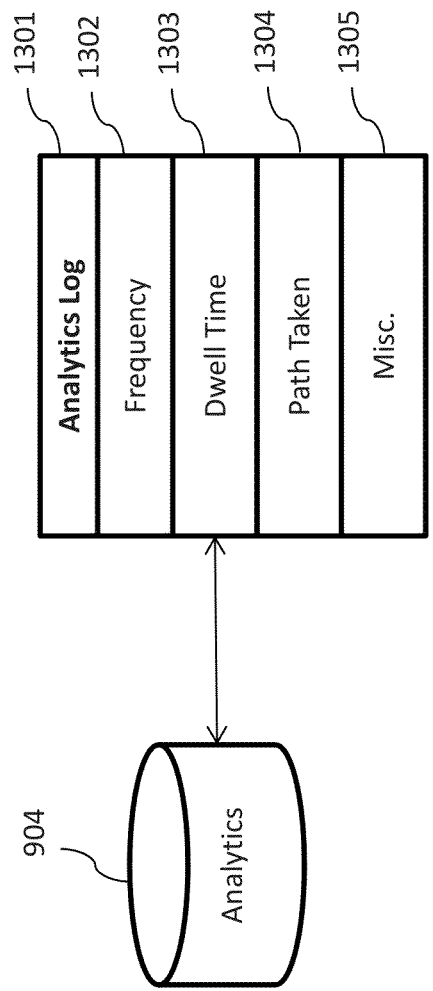
FIG. 13 illustrates the information contained in the Analytics database.

FIG. 13 is a description of the analytics database 904 and analytics log 1301 information containing frequency 1302, dwell time 1303, path taken 1304, and miscellaneous 1305. Analytics log 1101 is the file structure that contains the information found inside the analytics database 904. Frequency 1302 refers to the number of times each end user visits a particular location inside of a specific area 801. Separate records are maintained for individual users, and the frequency is aggregated and sorted in the frequency files database 904.

Dwell time 1303 refers to the time spent in each particular location inside of a specific area 801. Separate records are maintained for individual users, and the dwell times are aggregated and sorted in the dwell time file. Path taken 1304 refers to the physical path taken by a user in each specific area 801.

Figure 15:
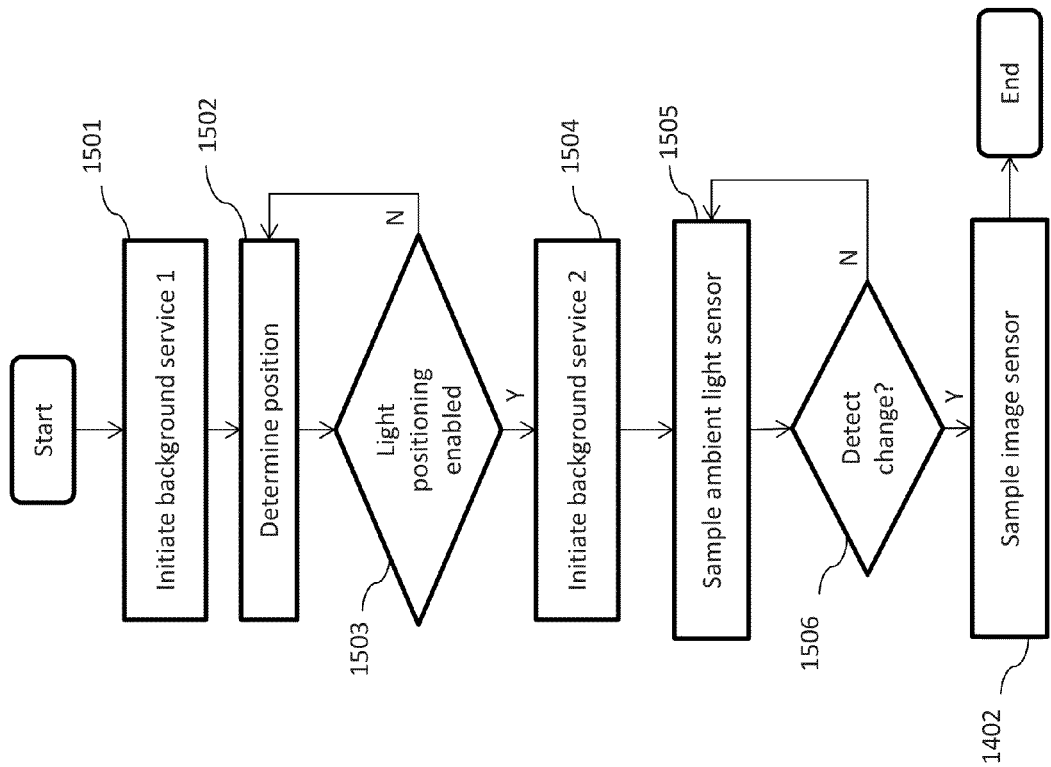
FIG. 15 is a process illustrating the background services and how they activate various sensors contained inside the mobile device.

As an example which combines many of the above descriptions, consider an example involving a store owner that installed a light based indoor positioning system, and a customer walking around the store using a mobile device 103 capable of receiving optically transmitted information. The customer drives to the parking lot of the store, parks, and walks in. Using the background sensors and location services available to her phone as modeled in FIG. 16, the customer's mobile device 103 already knows that she has approached, and most likely entered a store outfitted with a light based positioning system. Once this information is known, the application running on the customer's mobile device 103 initiates several background services and begins to start looking for optical signals as depicted in FIG. 15.

Prior to the customer entering the store, the store owner has already calibrated and preloaded the database 802 with the unique LED light sources 101, map 902 information pertaining to the store floor plan 1102 and user provided 1104 product locations, and content 903 in the form of multimedia and local deals in the form of promotions that can only be activated by visiting that particular section of the store.

In the meantime, the customer is walking around the store looking to find particular items on her shopping list which she has already digitally loaded onto her mobile device 103. Next the customer is prompted by her mobile device 103 that one of the items on her list has moved locations, and an image of the store layout is displayed with a flashing icon indicating where her desired product has moved. The mobile phone can guide her to the new product. Then as soon as she gets close to the product, an informational video is prompted on her screen detailing the most popular recipe and how it is prepared. And finally in addition to finding her desired product, the customer receives a discount promotion for taking the time to seek out the new location of the product.

In addition to the services offered by this system to the customer, the store owner now gains value from learning about the shopping experiences of the customer. This comes in the form of aggregated data that is captured and stored in the analytics 904 section of his stores database 802. This example is one of many applications that can be enabled with an accurate indoor light based positioning system.

Figure 14:
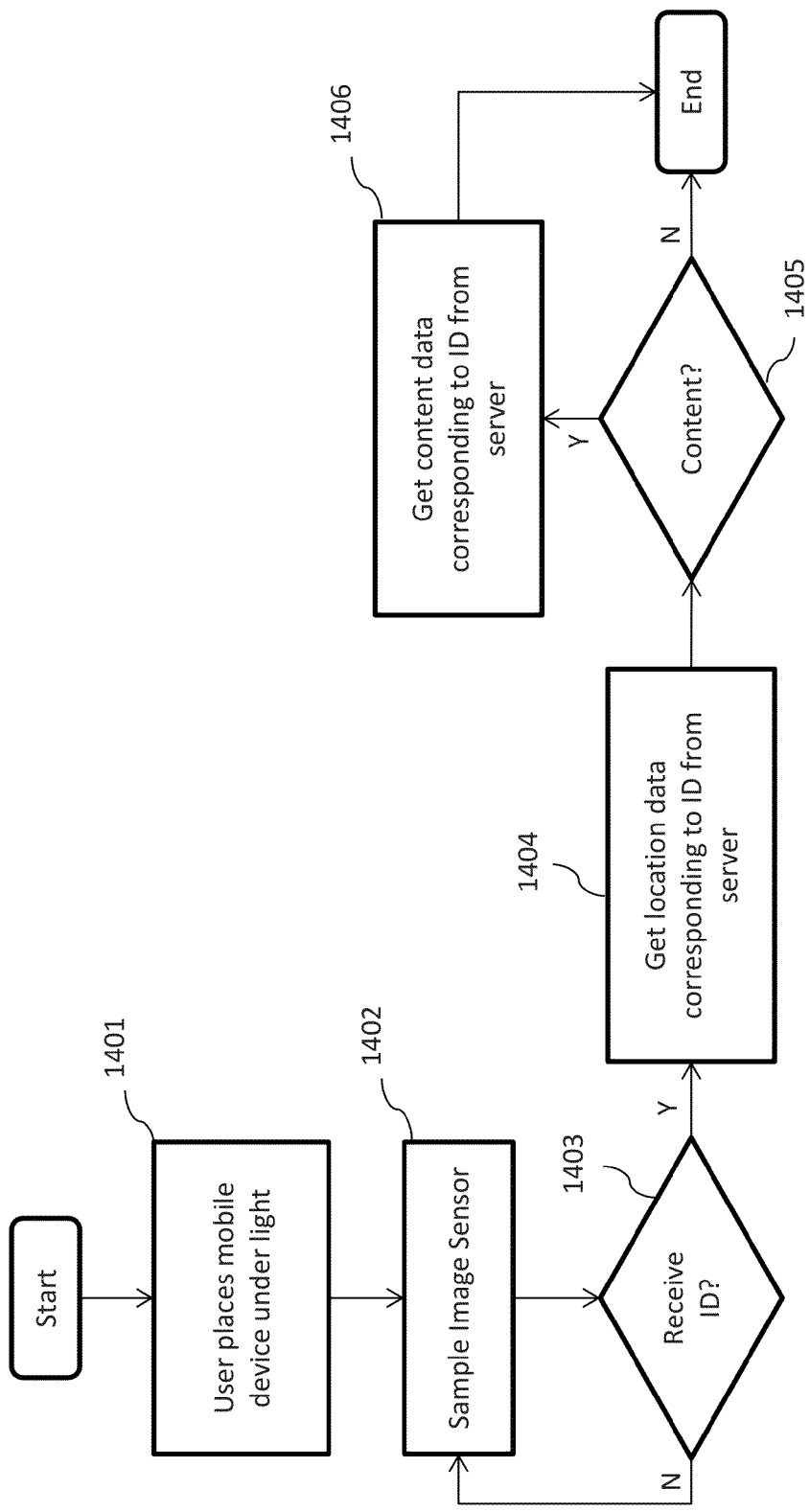
FIG. 14 illustrates the process of a mobile device receiving location and content information via a light based positioning system.

FIG. 14 is a process describing the act of receiving location and content information through visible light. User places mobile device under light 1401 corresponds to the act of physically placing a camera equipped mobile device 103 underneath an enabled LED light source 101. The user stands approximately underneath or adjacent the LED light source 101, and the mobile device has the LED light source 101 in view of the camera lens.

The next block, sample image sensor 1402, refers to the act of turning on and reading data from the embedded image sensor in the mobile device 103. Receive ID? 1403 is a decision block which either moves forward if a location ID is received, or returns to sample the image sensor 1402. Get location data corresponding to ID from server 1404 occurs once a location ID has been received. The mobile device queries the server asking for location data 702 relevant to the ID code. This describes the process of a user obtaining an ID code 701 from a non-networked LED light source 101, and using the unique identifier to look up additional information from either the server 703 or a locally stored source.

Finally, content? 1405 is another decision block which determines if there is location based content associated with the received ID code. If content is available the process continues on to the last block 1406 where the content is queried, if not the process ends. As described above, the get content data corresponding to ID from server 1405 refers to the act of retrieving content data associated with a known location from either a server 703 or local source.

FIG. 15 is a process describing the act of turning on the application background services and determining when to sample the image sensor. Initiate background service 1 1501 is the primary background running service on the mobile device. This service is tasked with initiating a function that can communicate wirelessly to determine if the mobile device is close to an enabled area. The wireless communication includes radio frequency communication techniques such as global position system (GPS), cellular communication (e.g., LTE, CDMA, UMTS, GSM), or WiFi communications. Determine position 1502 is the function that periodically samples the wireless communication signal and based on distance parameters decides whether or not the mobile device is close enough to an area to move forward to the next service.

Light positioning enabled? 1503 is a decision block that moves forward if the mobile device is close to an enabled location, or repeats the previous function if not. Initiate background service 2 1504 is activated once the mobile device enters an enabled area. The service is tasked with initiating the functions that receive location information via the modulated light.

Sample ambient light sensor 1505 is the first function of the previous service which samples the ambient light sensor data as soon as the sensor detects a change. The function of this task is to determine if the sensor has gone from dark to light, if the user takes the device out of a pocket or enclosure, or from light to dark, the user has placed the device inside of a pocket or enclosure. As an alternative to sampling the light sensor, the algorithm could also look for a change in the accelerometer reading. This would correspond to the user taking the phone out of their pocket. Detect change? 1506 is the decision block that moves forward if the ambient light sensor has gone from dark to light meaning that the mobile device is potentially in view of surrounding modulated light.

Figure 16:
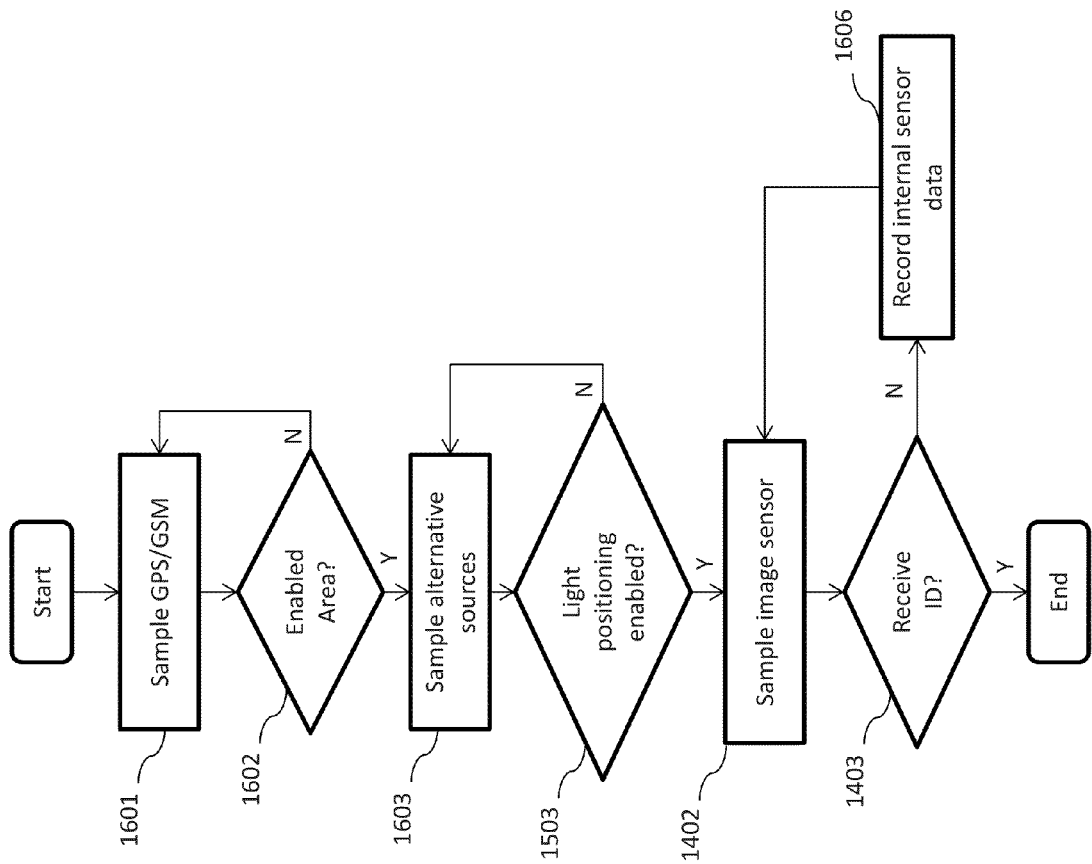
FIG. 16 illustrates the process of combining multiple information sources with a light based positioning service.

FIG. 16 is a process describing the act of determining a mobile devices position using a variety of information sources. Sample GPS/GSM 1601 refers to the act of determining if the mobile device is close to an enabled area. Enabled area? 1602 is a decision block which moves forward if the mobile device is close to a enabled area, or returns to the previous block if not.

Sample alternative sources 1603 refers to the act leveraging existing alternative positioning technologies such as WiFi, Bluetooth, ultrasound, inertial navigation, or employing an existing service using one or more of any available services. Record internal sensor data 1606 is a task which records the current accelerometer data for a period of time before returning to the Sample image sensor 1402 block. This task is performed so that location information is constantly being collected even when modulated light is not being detected. This allows the mobile device and/or server to keep track of the mobile device's position.

Figure 17:
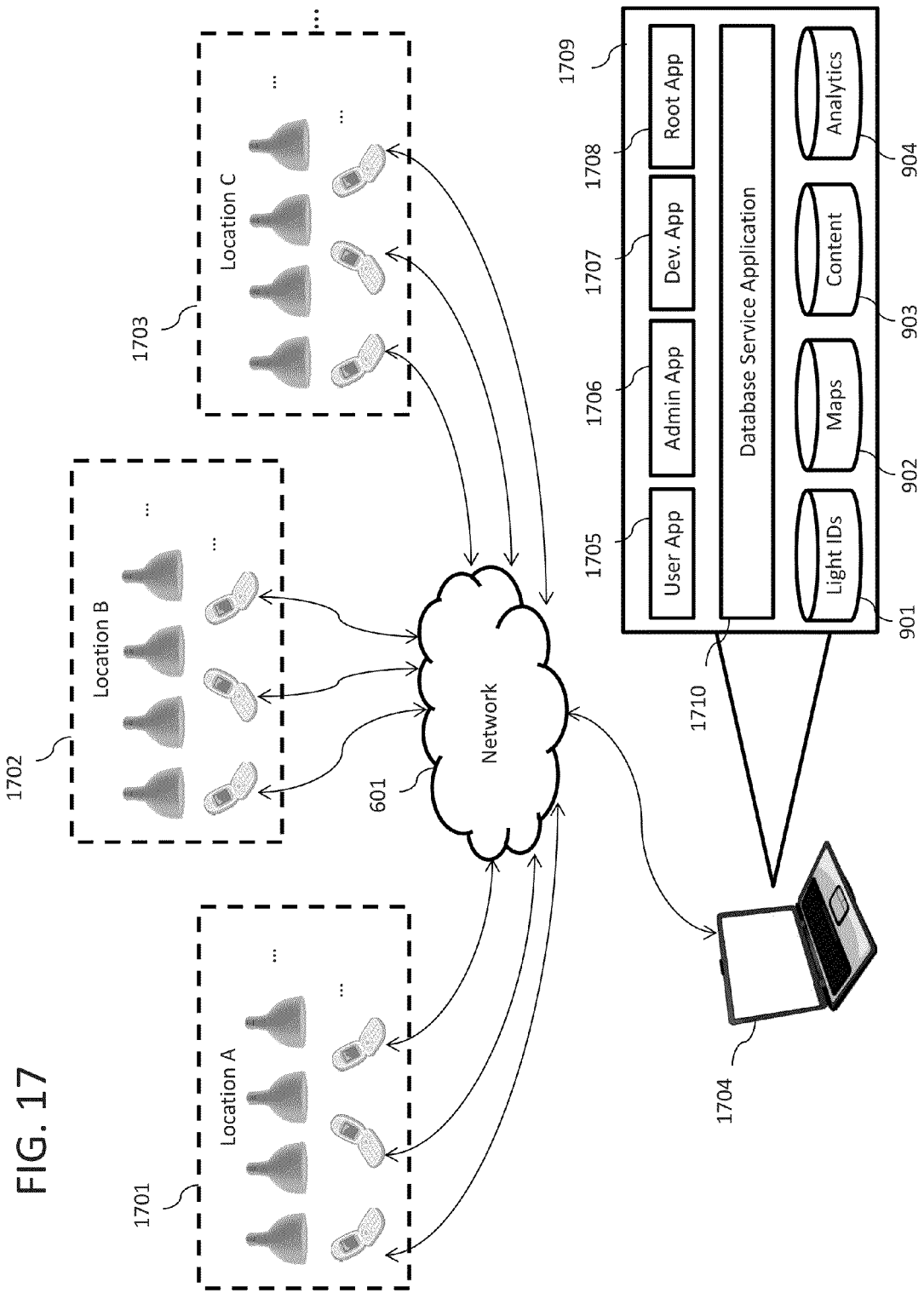
FIG. 17 illustrates how a client accesses multiple light positioning enabled locations with multiple mobile devices.

FIG. 17 is a system diagram describing how a client device 1704 interacts with a light based positioning system 1709. Network 601 is a generic local or remote network used to connect mobile devices 103 contained in locations A 1701, B 1702, and C 1703 with the light based positioning service 1709.

Each location contains multiple LED light sources 101, each of which broadcast unique identification codes 701. In order to interact with the system from an operators perspective, a mobile device can use the database service application 1710 which contains multiple privilege levels for different levels of access. The client privilege level determines read/write permissions to each of these databases. These levels include users 1705 which refer to general front end system users, administrators 1706 which are usually IT or operations management level within an installation, developers 1707 which have access to the application programming interfaces of the system for use in custom application development, and root 1708 level which contains master control over the users and access to everything contained in the system and databases.

Mobile devices in each location 1701, 1702, and 1703 receive identification codes 701 from lights in their respective locations. They then send the received identification codes 701 through the network 601 which connects to database service application 1710, through user application 1705, and has read access to maps 902 and content, and write access to analytics 904. A generic client, 1704, connects to database service application 1710 through network connection 601.

The client uses a password authorized login screen to access the respective permission status. Clients with administrator permissions have read/write access to light IDs 901, read access to maps 902, read/write access to content 903, and read access to analytics 904. Clients with developer permissions 1707 have read access to light IDs, read access to maps 902, read/write access to content 903, and read access to analytics 904. A client with root permissions 1708 has read/write access to databases 901-904.

As an overview, FIG. 17 describes the top down approach to our current implementation of a light based positioning system. At the highest level, known locations of installed non-network standalone LED light sources 101 are used to accurately identify the relative position of mobile devices 103. In order to obtain identification information from the lights, the background processes running on the mobile device 103 have been described in FIGS. 14, 15, 16. Once the mobile device has acquired a unique or semi-unique ID code 701 from the light or combination of lights, it uses this information to query a database 802 for additional information. This information can come in many forms, and is used to create a more personalized experience for the user. As initially mentioned, this local experience is used for location aware mobile computing, and augmented reality applications. In addition to local personalized information, location based analytics applications can be enabled from the aggregated data and traffic running through the server 703.

The use of light based positioning capabilities provide a number of benefits. For example, the positioning information obtained by using light sources is highly precise compared to alternative techniques for positioning information. The accuracy of a light based positioning system can be down to a few centimeters in three dimensions in some embodiments. This positioning ability enables a number of useful services to be provided. In certain embodiments, additional mobile device information can be used in combination with the positioning information. For example, accelerometer position information can be used in conjunction with light source based position to offer augmented reality or location aware content that relevant to the device's position. The relevant content can be displayed to augment what is being displayed on the mobile device or the display can provide relevant information. Applications on the mobile device can also be launched when the mobile device enters certain areas or based on a combination of criteria and position information. The applications can be used to provide additional information to the user of the mobile device.

The light based positioning systems and methods can also be used to manage and run a business. For example, the light based positioning can help keep track of inventory and to make changes to related databases of information. In a warehouse, for example, the light positioning system can direct a person to where a particular item is located by giving directions and visual aids. The light positioning can even provide positioning information to direct the person to the correct shelf the item is currently residing on. If the person removes the item, the mobile device can update the inventory databases to reflect the change. The same function can be implemented in a store environment as merchandise locations are changed or updated. This information can then be used in providing content to a user. For example, if a shopper wants more information about an item, the updated location can be used to locate the item or direct the shopper to an online website to purchase an out of stock item. In some embodiments, the mobile device using the light based positioning technique in conjunction with a wireless connection and other information can be used to provide non-intrusive data collection on customers. The data collection of how customers move through a store and where they spend time can be used to improve layout of stores and displays of merchandise.

The light based positioning system are also easy and low cost to setup compared to other location positioning systems. Since each light source operates autonomously, a building owner only needs to swap out existing light sources for those that provide light based information to a camera enabled device. The light sources are non-networked independent beacons that broadcast identification codes configured when manufactured. This allows the light sources to be manufactured at a lower cost compared to networked light sources. Further, the non-networked independent beacon light sources in the light based positioning system can be easier for building owners to install.

The light based positioning system can also include optimizations in some embodiments. For example, location information obtained from either the identification code or from alternative techniques can be used to reduce latency in determining position information. This optimization can work through geo-fencing by constraining the search area to find information regarding the captured light sources more quickly. This can reduce the overall delay experienced by a user from the time the mobile device captures the light sources to when relevant position information is provide to the mobile device and/or relevant content is provided to the mobile device.

The techniques and methods disclosed for use in light based positioning systems can be used with a variety of camera equipped mobile or stationary devices, such as: mobile phones, tablet computers, netbooks, laptops, desktops, or custom designed hardware. Further, the scope of the present invention is not limited to the above described embodiments, but rather is defined by the appended claims. These claims represent modifications and improvements to what has been described.

We claim:

1. A method of commissioning a location-determination system utilizing information encoded in modulated light emitted by a plurality of light sources, each light source broadcasting an identifier via a light output modulated in accordance with a different time-varying signal so as to vary over time, the method comprising:
    (a) disposing an image sensor proximate a location of one of the light sources such that light from the light source at least partially illuminates the image sensor;
    (b) acquiring an image of the light from the light source, different portions of the image being acquired at different times over a time interval, whereby the acquired image comprises a pattern of distortions resulting from interaction between the time-varying light output of the light source and the time interval of acquisition;
    (c) decoding the pattern of distortions to recover the identifier of the light source;
    (d) associating the identifier of the light source with the location of the light source in a database; and
    (e) repeating steps (a)-(d) for each additional light source of the plurality of light sources.

2. The method of claim 1, wherein the plurality of light sources are driven by pulse-width modulated signals.

3. The method of claim 1, wherein the plurality of light sources are asynchronous.

4. The method of claim 1, wherein the image sensor comprises a CCD image sensor.

5. The method of claim 1, wherein the image sensor comprises a CMOS image sensor.

6. The method of claim 1, wherein the image sensor comprises a rolling shutter for exposing different portions of the image sensor at different times.

7. The method of claim 1, wherein the pattern of distortions comprises alternating dark and light stripes.

8. The method of claim 7, wherein decoding the pattern of distortions comprises measuring stripe width within the acquired image.

9. The method of claim 7, wherein widths of stripes in the image are inversely related to a frequency of the modulated light.

10. The method of claim 1, wherein the each light source comprises one or more light-emitting diodes (LEDs).

11. The method of claim 10, wherein the LEDs emit substantially white light.

12. The method of claim 1, wherein the image sensor is disposed within a mobile device.

13. The method of claim 12, wherein associating the identifier of the light source with the location of the light source in the database comprises transmitting the identifier of the light source and the location of the light source to a remote server.

14. The method of claim 12, further comprising displaying on the mobile device at least a portion of a map of a space illuminated by the plurality of light sources, the map displaying the locations of the light sources within the space.

15. The method of claim 14, wherein associating the identifier of the light source with the location of the light source in the database comprises selecting the location of the light source on the map displayed on the mobile device.

16. The method of claim 12, further comprising associating the identifier of the light source with additional location information (i) received at the mobile device and (ii) not based on visible light illuminating the image sensor.

17. The method of claim 16, wherein the additional location information is based on data from at least one of WiFi signals, GPS signals, GSM signals, Bluetooth signals, a cellular tower, or an inertial sensor.

18. A device for commissioning a location-determination system utilizing information encoded in modulated light emitted by a plurality of light sources, each light source broadcasting an identifier via a light output modulated in accordance with a different time-varying signal so as to vary over time, the device comprising:
- an image sensor configured to acquire an image at least partially illuminated by light emitted by a light source, different portions of the image being acquired at different times over a time interval, whereby the acquired image comprises a pattern of distortions resulting from interaction between the time-varying light output and the time interval of acquisition;
- a processor for decoding the pattern of distortions to recover the identifier of the light source;
- a display for depicting at least a portion of a map of a space illuminated by the plurality of light sources, the map displaying the locations of the light sources (i) within the space and (ii) to be associated with identifiers recovered by the processor; and
- a communications module for communicating with a database, the database storing the identifiers of the light sources associated with locations of the light sources.

19. The device of claim 18, further comprising an input module for accepting user input indicating a light source to be associated with an identifier recovered by the processor.

20. The device of claim 18, wherein the image sensor, the processor, and the display are disposed within a mobile device.

21. The device of claim 20, wherein the database is located at a remote server.

22. The device of claim 20, wherein (i) the mobile device comprises a memory, and (ii) at least a portion of the database is stored in the memory.

23. The device of claim 18, wherein the image sensor comprises a CCD image sensor.

24. The device of claim 18, wherein the image sensor comprises a CMOS image sensor.

25. The device of claim 18, wherein the image sensor comprises a rolling shutter for exposing different portions of the image sensor at different times.

26. The device of claim 18, wherein the pattern of distortions comprises alternating dark and light stripes.

27. The device of claim 26, wherein the processor is configured to decode the pattern of distortions by measuring stripe width within the acquired image.

28. The device of claim 26, wherein widths of stripes in the image are inversely related to a frequency of the modulated light emitted by the light source.

29. The device of claim 18, wherein the database stores location-based content (i) associated with locations of the light sources and (ii) for output on the display.

* * * * *